(12) United States Patent
Fan et al.

(10) Patent No.: US 11,073,682 B2
(45) Date of Patent: Jul. 27, 2021

(54) OPTICAL LENS SET

(71) Applicant: Genius Electronic Optical (Xiamen) Co., Ltd., Fujian (CN)

(72) Inventors: Ta-Cheng Fan, Taichung (TW); Zhenfeng Xie, Fujian (CN); Yanxuan Yin, Fujian (CN)

(73) Assignee: Genius Electronic Optical (Xiamen) Co., Ltd., Xiamen (CN)

(*) Notice: Subject to any disclaimer, the term of this patent is extended or adjusted under 35 U.S.C. 154(b) by 0 days.

(21) Appl. No.: 16/792,894

(22) Filed: Feb. 18, 2020

(65) Prior Publication Data

US 2020/0249438 A1  Aug. 6, 2020

Related U.S. Application Data

(63) Continuation of application No. 15/441,253, filed on Feb. 24, 2017, now Pat. No. 10,606,034.

(30) Foreign Application Priority Data

Dec. 30, 2016 (CN) .......................... 201611254134.1

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/18; G02B 27/0025; G02B 13/04; G02B 3/04; G02B 13/02; G02B 13/16; G02B 13/002; G02B 13/22; G02B 13/006; G02B 17/08; G02B 5/005; G02B 9/60; G02B 13/0015; G02B 13/004; G02B 13/06; G02B 9/62; G02B 3/02; G02B 13/0065; H04N 5/23296; H04N 5/2254; H04N 5/23212; H04N 5/23238; H04N 1/02815; H04N 1/1935; H04N 2101/00; H04N 2201/0081; H04N 2201/0091; H04N 2201/0093; H04N 2209/047; H04N 5/225; H04N 5/2256; H04N 5/2257; H04N 5/2258; H04N 5/232;
(Continued)

(56) References Cited

U.S. PATENT DOCUMENTS

2016/0124191 A1* 5/2016 Hashimoto ........ G02B 13/0045
359/708
2017/0184822 A1* 6/2017 Shi ..................... G02B 27/0025
(Continued)

*Primary Examiner* — William R Alexander
*Assistant Examiner* — Sharrief I Broome
(74) *Attorney, Agent, or Firm* — Winston Hsu

(57) ABSTRACT

An optical-lens-set includes a first lens element of a concave image-side surface near its optical-axis, a sixth lens element of negative refractive power and of a concave image-side surface near its optical-axis to go with a fifth lens element of a concave object-side surface near its optical-axis or with a seventh lens element of negative refractive power. The Abbe number υ1 of the first lens element, the Abbe number υ3 of the third lens element, the Abbe number υ4 of the fourth lens element, the Abbe number υ5 of the fifth lens element, the Abbe number υ6 of the sixth lens element and the Abbe number υ7 of the seventh lens element together satisfy 5≤5υ1−(υ3+υ4+υ5+υ6+υ7).

20 Claims, 25 Drawing Sheets

(58) Field of Classification Search
CPC .. H04N 5/23245; H04N 5/2355; H04N 5/335; H04N 5/3572
See application file for complete search history.

(56) References Cited

U.S. PATENT DOCUMENTS

2017/0199353 A1\* 7/2017 Teraoka ............. G02B 13/0045
2018/0074298 A1\* 3/2018 Jung ..................... G02B 9/64

\* cited by examiner

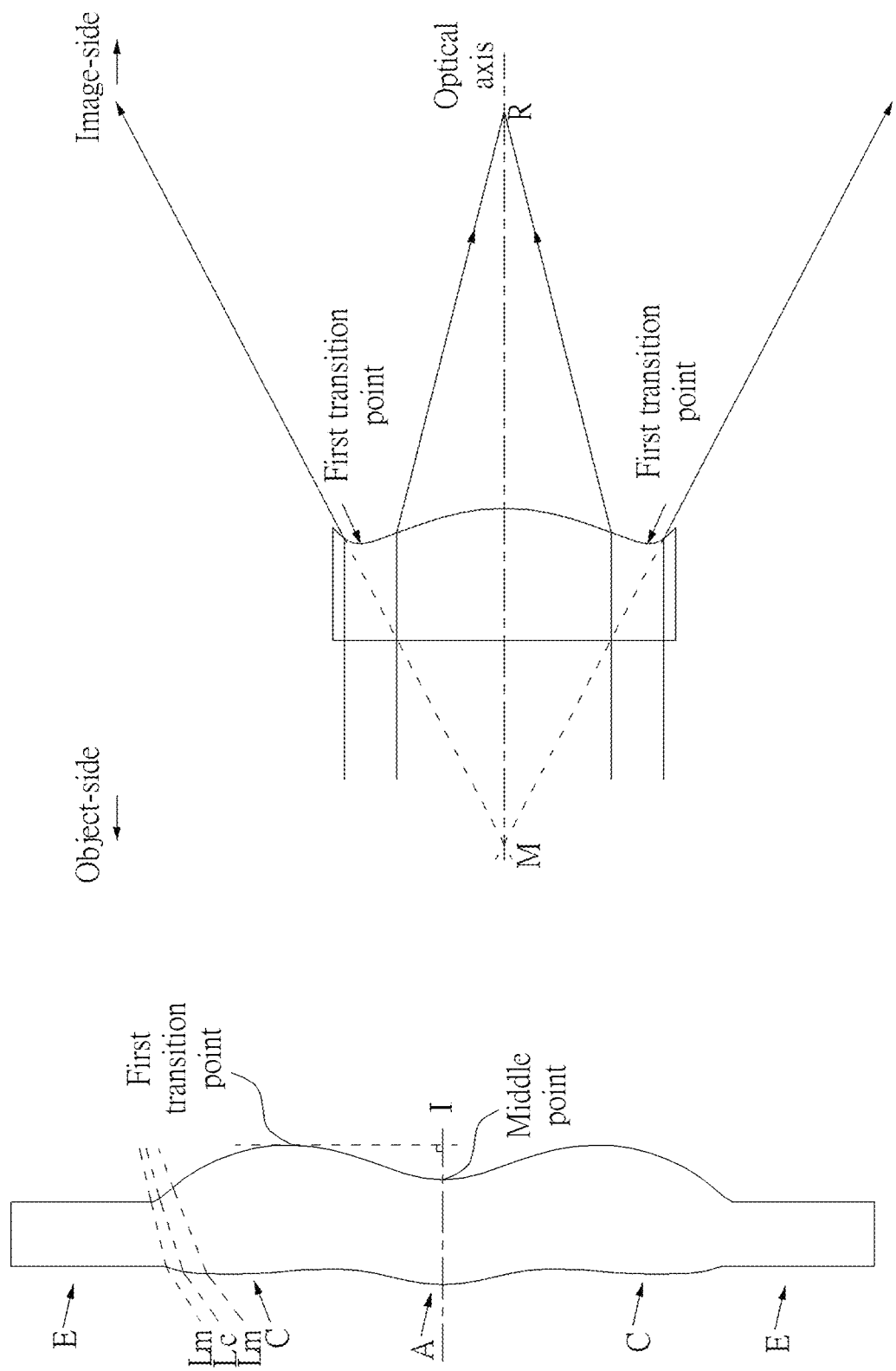

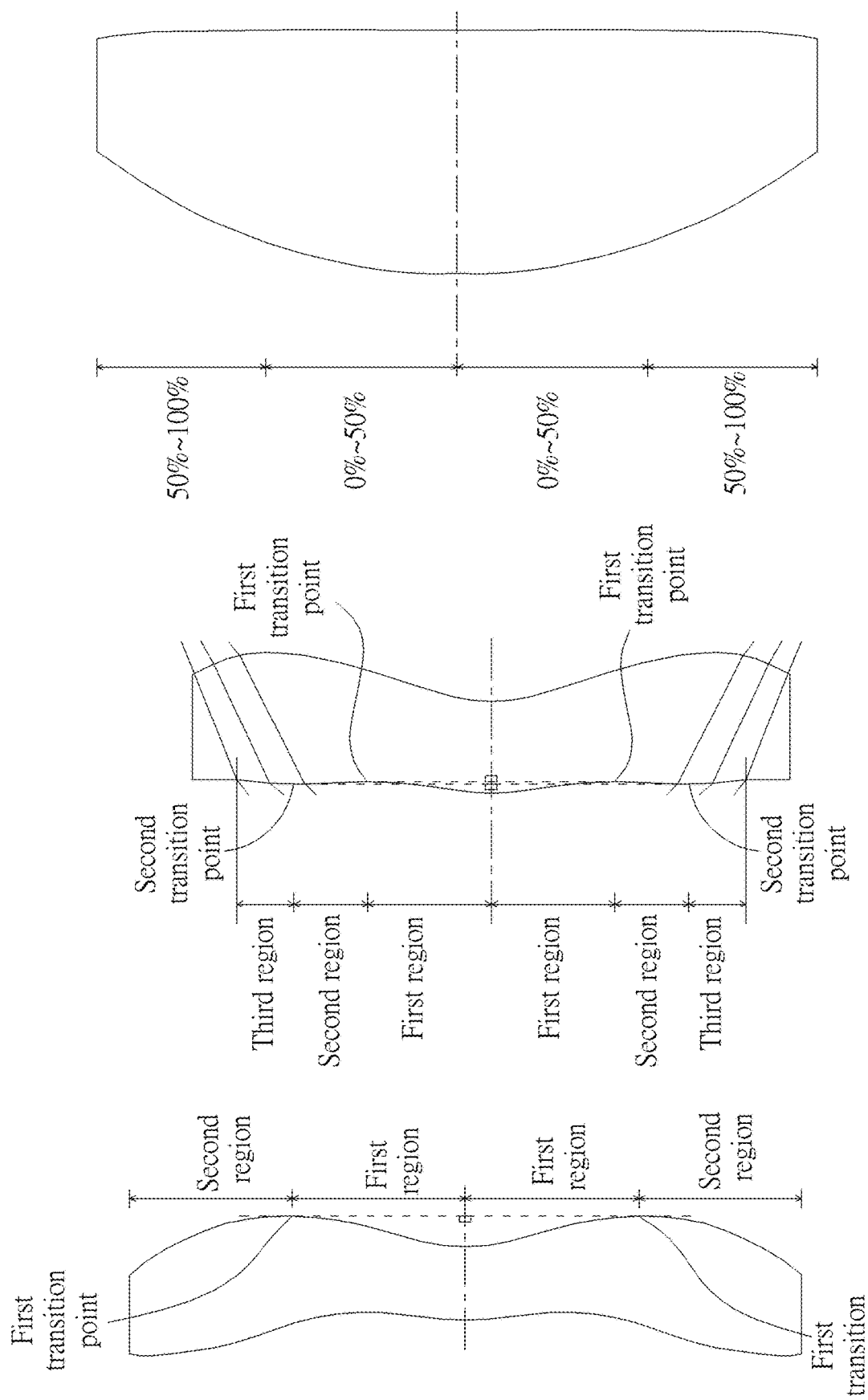

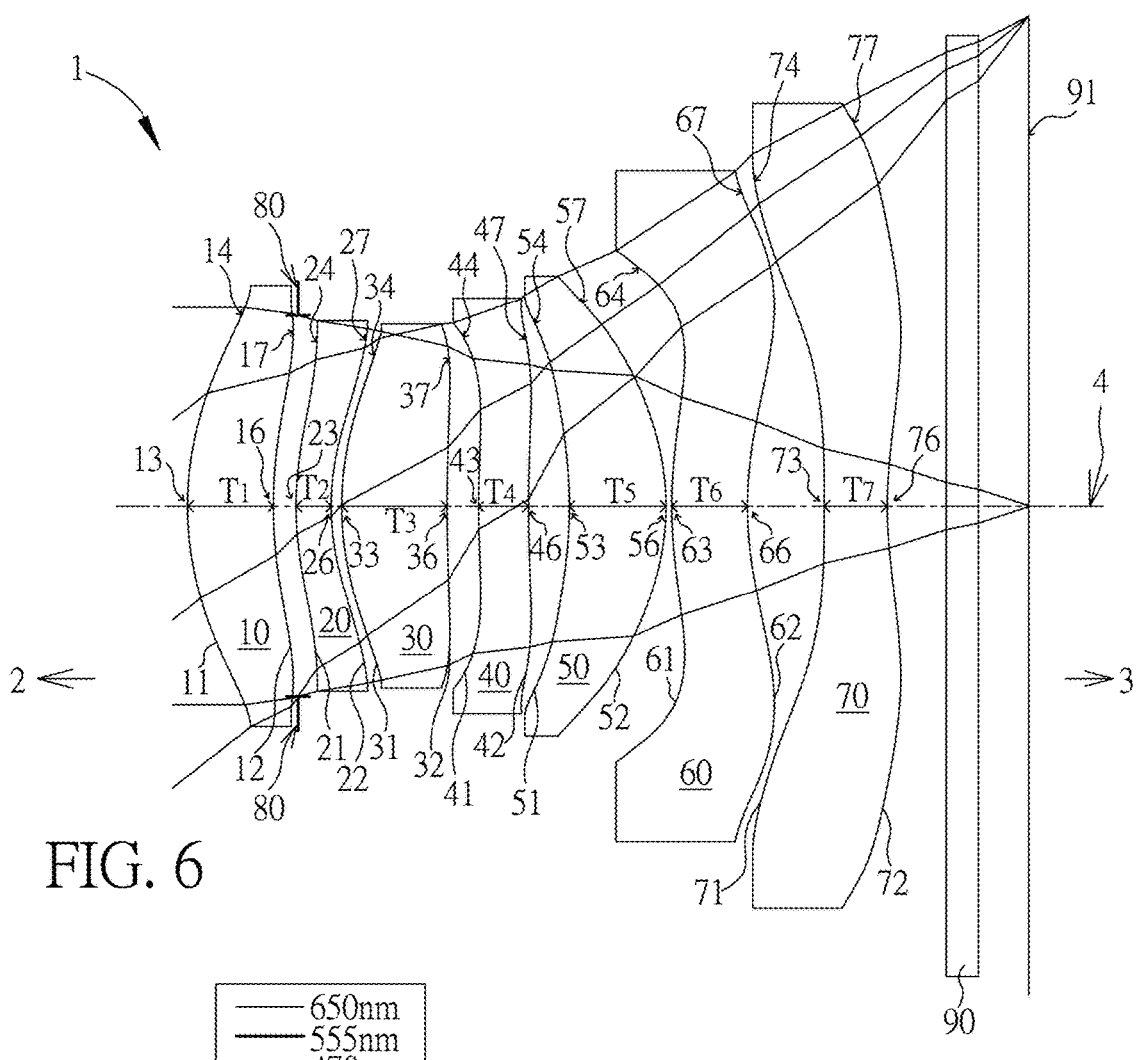
FIG. 6
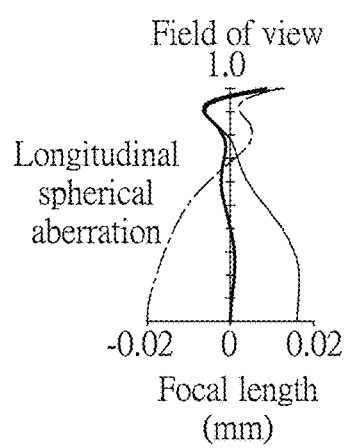 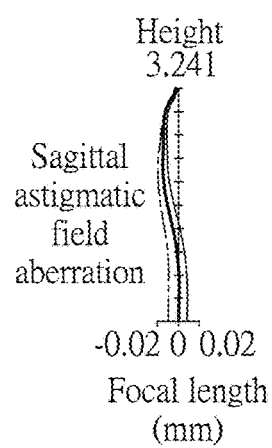 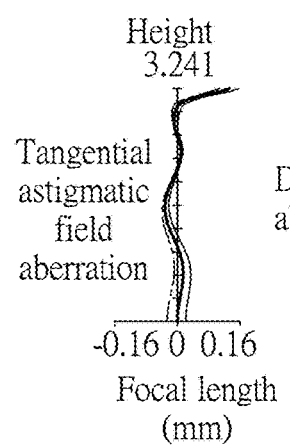 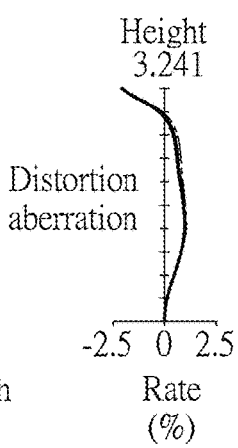
FIG. 7A  FIG. 7B  FIG. 7C  FIG. 7D

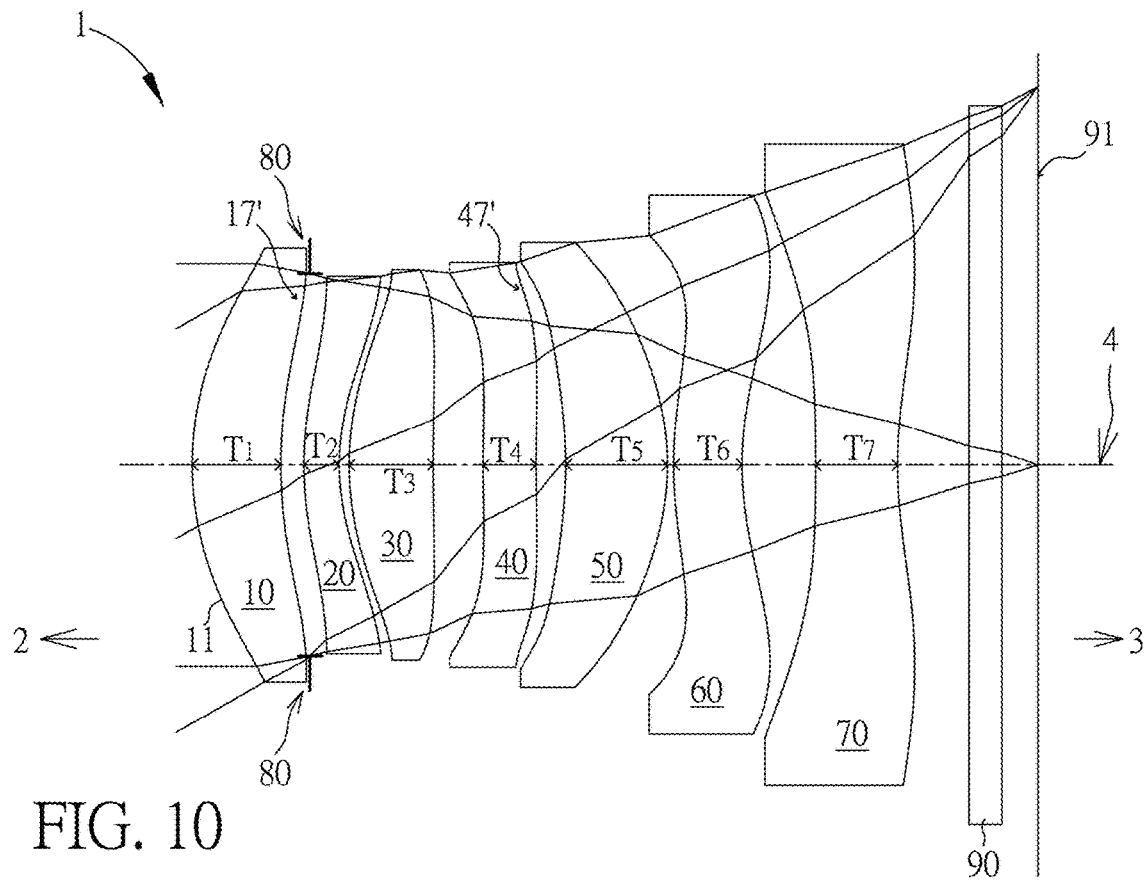
FIG. 10
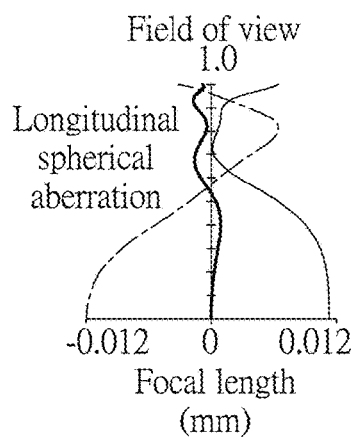
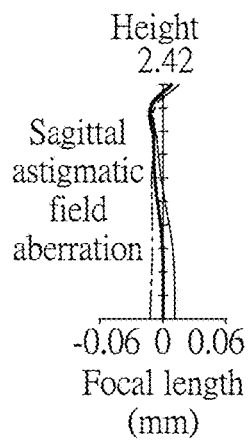
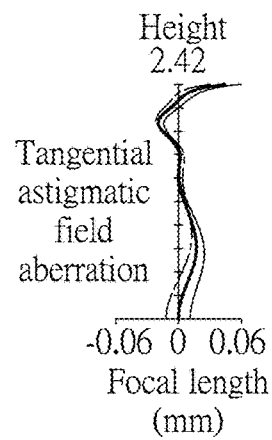
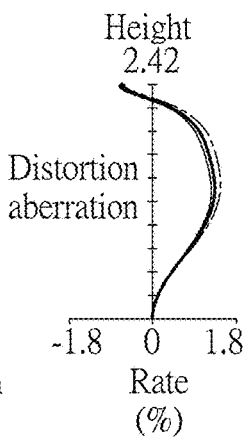
FIG. 11A   FIG. 11B  FIG. 11C  FIG. 11D

| First Example |||||||
|---|---|---|---|---|---|---|
| EFL=4.2413 mm ||  HFOV=38.0038 Degrees || TTL=5.5600 mm | | Fno=1.6239 |
| No. | | Curvature Radius | Ape. Stop Lens Thickness Air Gap | | Refractive Index | Abbe No. | Focal Length |
| | Object | INFINITY | INFINITY | | | | |
| 11 | First Lens | 2.1586 | 0.5666 | $T_1$ | 1.5445 | 55.9870 | 10.7623 |
| 12 | | 3.0947 | 0.1624 | $G_{12}$ | | | |
| 80 | Ape. Stop | INFINITY | -0.0132 | | | | |
| 21 | Second Lens | 2.2821 | 0.2312 | $T_2$ | 1.6612 | 20.3683 | -9.5431 |
| 22 | | 1.6117 | 0.0700 | $G_{23}$ | | | |
| 31 | Third Lens | 2.0367 | 0.6991 | $T_3$ | 1.5445 | 55.9870 | 4.5106 |
| 32 | | 10.3206 | 0.2088 | $G_{34}$ | | | |
| 41 | Fourth Lens | 7.3154 | 0.3288 | $T_4$ | 1.6612 | 20.3683 | 42.6590 |
| 42 | | 9.6703 | 0.2692 | $G_{45}$ | | | |
| 51 | Fifth Lens | -2.8654 | 0.6373 | $T_5$ | 1.5445 | 55.9870 | 6.1852 |
| 52 | | -1.6723 | 0.0379 | $G_{56}$ | | | |
| 61 | Sixth Lens | 3.0909 | 0.5041 | $T_6$ | 1.5445 | 55.9870 | -29.8969 |
| 62 | | 2.4493 | 0.5049 | $G_{67}$ | | | |
| 71 | Seventh Lens | -28.3352 | 0.4160 | $T_7$ | 1.5445 | 55.9870 | -4.7035 |
| 72 | | 2.8403 | 0.3902 | | | | |
| 90 | IR Filter | INFINITY | 0.2100 | | 1.5168 | 64.1673 | |
| | | INFINITY | 0.3366 | | | | |
| 91 | Image Plane | INFINITY | | | | | |

FIG. 20

| No. | 11 | 12 | 21 | 22 | 31 | 32 | 41 |
|---|---|---|---|---|---|---|---|
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | -1.006152E-03 | 6.538150E-03 | -4.645819E-02 | -8.234896E-02 | -1.663774E-02 | -3.127842E-02 | -7.904520E-02 |
| a6 | -1.098107E-02 | -7.834689E-02 | -1.155587E-01 | -1.139306E-01 | -2.911083E-02 | -9.401135E-03 | -3.119469E-02 |
| a8 | 2.932046E-03 | 3.263947E-02 | 8.060438E-02 | 8.074139E-02 | -8.469954E-03 | 3.120004E-02 | -6.745967E-02 |
| a10 | -2.245945E-03 | -5.175948E-03 | -1.708841E-02 | -2.122899E-02 | 1.319471E-02 | -3.938725E-02 | 1.424887E-01 |
| a12 | 0.000000E+00 | 0.000000E+00 | 0.000000E+00 | 0.000000E+00 | -4.693643E-03 | 1.070078E-02 | -1.244067E-01 |
| a14 | 0.000000E+00 | 0.000000E+00 | 0.000000E+00 | 0.000000E+00 | 0.000000E+00 | 0.000000E+00 | 5.242690E-02 |
| a16 | 0.000000E+00 | 0.000000E+00 | 0.000000E+00 | 0.000000E+00 | 0.000000E+00 | 0.000000E+00 | -8.365715E-03 |
| No. | 42 | 51 | 52 | 61 | 62 | 71 | 72 |
| K | 0.000000E+00 | 0.000000E+00 | 0.000000E+00 | 0.000000E+00 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | -1.460190E-02 | 7.619197E-02 | 5.456819E-02 | -6.817698E-02 | -5.765642E-02 | -9.708778E-02 | -1.299084E-01 |
| a6 | -4.701562E-02 | -2.753821E-02 | -5.677296E-03 | -9.323030E-03 | -1.798896E-02 | 2.504735E-02 | 4.468814E-02 |
| a8 | -2.449435E-03 | -8.447467E-02 | -1.584827E-02 | -1.120811E-02 | 1.080669E-02 | -2.319356E-04 | -1.376853E-02 |
| a10 | 8.435034E-03 | 7.301965E-02 | 2.010819E-02 | 1.052754E-04 | -3.059142E-03 | 3.138823E-04 | 3.271750E-03 |
| a12 | 1.068055E-02 | -3.347305E-02 | -1.255145E-02 | -3.977155E-03 | 3.597364E-04 | -4.559383E-04 | -4.931386E-04 |
| a14 | -8.876037E-03 | 8.358396E-03 | 3.825771E-03 | 2.429372E-04 | 9.937571E-06 | 9.902936E-05 | 3.915996E-05 |
| a16 | 2.047721E-03 | -4.496931E-04 | -3.276480E-04 | 9.871772E-05 | -3.676933E-06 | -6.483076E-06 | -1.252478E-06 |

FIG. 21

| Second Example | | | | | | |
|---|---|---|---|---|---|---|
| EFL=4.1379 mm | | HFOV=38.0020 Degrees | | TTL=5.3991 mm | | Fno=1.6025 |
| No. | | Curvature Radius | Ape. Stop Lens Thickness Air Gap | | Refractive Index | Abbe No. | Focal Length |
| | Object | INFINITY | INFINITY | | | | |
| 11 | First Lens | 2.1220 | 0.5459 | $T_1$ | 1.5445 | 55.9870 | 9.5691 |
| 12 | | 3.2474 | 0.1790 | $G_{12}$ | | | |
| 80 | Ape. Stop | INFINITY | 0.0131 | | | | |
| 21 | Second Lens | 2.3438 | 0.2374 | $T_2$ | 1.6612 | 20.3683 | -8.7108 |
| 22 | | 1.6024 | 0.0848 | $G_{23}$ | | | |
| 31 | Third Lens | 2.0567 | 0.6619 | $T_3$ | 1.5445 | 55.9870 | 4.5630 |
| 32 | | 10.4223 | 0.2363 | $G_{34}$ | | | |
| 41 | Fourth Lens | 7.9950 | 0.3135 | $T_4$ | 1.6612 | 20.3683 | 49.9461 |
| 42 | | 10.3549 | 0.2197 | $G_{45}$ | | | |
| 51 | Fifth Lens | -3.1090 | 0.5159 | $T_5$ | 1.5445 | 55.9870 | 6.1978 |
| 52 | | -1.7157 | 0.1624 | $G_{56}$ | | | |
| 61 | Sixth Lens | 3.0635 | 0.4671 | $T_6$ | 1.5445 | 55.9870 | -24.2005 |
| 62 | | 2.3532 | 0.5071 | $G_{67}$ | | | |
| 71 | Seventh Lens | -68.5815 | 0.3700 | $T_7$ | 1.5445 | 55.9870 | -4.9760 |
| 72 | | 2.8359 | 0.5765 | | | | |
| 90 | IR Filter | INFINITY | 0.2100 | | 1.5168 | 64.1673 | |
| | | INFINITY | 0.0985 | | | | |
| 91 | Image Plane | INFINITY | | | | | |

FIG. 22

| No. | 11 | 12 | 21 | 22 | 31 | 32 | 41 |
|---|---|---|---|---|---|---|---|
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | -8.740006E-04 | 1.369765E-02 | -4.383152E-02 | -8.291879E-02 | -1.610474E-02 | -3.499993E-02 | -9.383298E-02 |
| a6 | -1.191682E-02 | -7.579925E-02 | -1.141312E-01 | -1.168129E-01 | -2.774866E-02 | -8.024958E-03 | -3.381421E-02 |
| a8 | 2.456468E-03 | 3.164584E-02 | 7.971770E-02 | 8.256333E-02 | -7.822951E-03 | 3.162304E-02 | -4.605412E-02 |
| a10 | -1.861354E-03 | -5.195362E-03 | -1.691850E-02 | -2.107365E-02 | 1.195315E-02 | -3.962221E-02 | 1.129660E-01 |
| a12 | 0.000000E+00 | 0.000000E+00 | 0.000000E+00 | 0.000000E+00 | -4.654492E-03 | 1.060050E-02 | -9.740215E-02 |
| a14 | 0.000000E+00 | 0.000000E+00 | 0.000000E+00 | 0.000000E+00 | 0.000000E+00 | 0.000000E+00 | 4.068898E-02 |
| a16 | 0.000000E+00 | 0.000000E+00 | 0.000000E+00 | 0.000000E+00 | 0.000000E+00 | 0.000000E+00 | -6.344336E-03 |
| No. | 42 | 51 | 52 | 61 | 62 | 71 | 72 |
| K | 0.000000E+00 | 0.000000E+00 | 0.000000E+00 | 0.000000E+00 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | -2.665513E-02 | 7.956928E-02 | 5.956350E-02 | -7.079948E-02 | -6.746220E-02 | -1.003298E-01 | -1.289681E-01 |
| a6 | -4.844567E-02 | -4.452984E-04 | -1.593498E-03 | -1.707290E-02 | -1.497051E-02 | 2.496364E-02 | 4.394373E-02 |
| a8 | -3.815939E-03 | -8.523235E-02 | -1.429428E-02 | 1.430127E-03 | 1.053009E-02 | -5.701320E-04 | -1.342530E-02 |
| a10 | 8.474139E-03 | 7.215464E-02 | 2.120701E-02 | 6.071015E-03 | -3.165082E-03 | 3.144643E-04 | 3.221069E-03 |
| a12 | 8.079027E-03 | -3.364404E-02 | -1.270934E-02 | -4.574755E-03 | 3.574554E-04 | -4.464505E-04 | -4.991379E-04 |
| a14 | -7.042128E-03 | 8.231006E-03 | 3.720720E-03 | 1.206238E-03 | 9.940951E-06 | 1.003501E-04 | 4.139776E-05 |
| a16 | 1.674972E-03 | -5.714520E-04 | -3.298426E-04 | -9.578914E-05 | -3.452159E-06 | -6.713527E-06 | -1.392661E-06 |

FIG. 23

| | Third Example | | | | | |
|---|---|---|---|---|---|---|
| | EFL=4.1320 mm | HFOV=30.1264 Degrees | | TTL=5.3665 mm | | Fno=1.6197 |
| No. | | Curvature Radius | Ape. Stop Lens Thickness Air Gap | | Refractive Index | Abbe No. | Focal Length |
| | Object | INFINITY | INFINITY | | | | |
| 11 | First Lens | 2.0292 | 0.5611 | $T_1$ | 1.5445 | 55.9870 | 8.8180 |
| 12 | | 3.1637 | 0.1838 | $G_{12}$ | | | |
| 80 | Ape. Stop | INFINITY | -0.0376 | | | | |
| 21 | Second Lens | 2.3044 | 0.2238 | $T_2$ | 1.6612 | 20.3683 | -7.5234 |
| 22 | | 1.5178 | 0.0628 | $G_{23}$ | | | |
| 31 | Third Lens | 1.9767 | 0.5321 | $T_3$ | 1.5445 | 55.9870 | 4.0771 |
| 32 | | 15.9078 | 0.3208 | $G_{34}$ | | | |
| 41 | Fourth Lens | 11.7583 | 0.3351 | $T_4$ | 1.6612 | 20.3683 | 45.4782 |
| 42 | | 18.9834 | 0.1867 | $G_{45}$ | | | |
| 51 | Fifth Lens | -2.9291 | 0.6446 | $T_5$ | 1.5445 | 55.9870 | 6.2486 |
| 52 | | -1.6990 | 0.0392 | $G_{56}$ | | | |
| 61 | Sixth Lens | 2.7429 | 0.4374 | $T_6$ | 1.5445 | 55.9870 | -24.2321 |
| 62 | | 2.1441 | 0.4653 | $G_{67}$ | | | |
| 71 | Seventh Lens | -22.2398 | 0.5188 | $T_7$ | 1.5445 | 55.9870 | -4.4862 |
| 72 | | 2.7769 | 0.4521 | | | | |
| 90 | IR Filter | INFINITY | 0.2100 | | 1.5168 | 64.1673 | |
| | | INFINITY | 0.2305 | | | | |
| 91 | Image Plane | INFINITY | | | | | |

FIG. 24

| No. | 11 | 12 | 21 | 22 | 31 | 32 | 41 |
|---|---|---|---|---|---|---|---|
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | 1.511157E-03 | 1.967607E-02 | -4.410452E-02 | -8.468923E-02 | -1.447136E-02 | -4.246974E-02 | -1.125488E-01 |
| a6 | -1.017369E-02 | -7.231650E-02 | -1.175029E-01 | -1.241501E-01 | -3.150126E-02 | -9.599118E-04 | -3.249252E-02 |
| a8 | 3.196491E-03 | 2.900931E-02 | 8.611012E-02 | 8.163929E-02 | -1.017944E-02 | 2.783092E-02 | -4.453138E-02 |
| a10 | -2.393247E-03 | -4.561924E-03 | -1.933223E-02 | -2.092846E-02 | 1.150123E-02 | -3.585730E-02 | 1.132903E-01 |
| a12 | 0.000000E+00 | 0.000000E+00 | 0.000000E+00 | 0.000000E+00 | -4.544526E-03 | 9.160073E-03 | -9.525522E-02 |
| a14 | 0.000000E+00 | 0.000000E+00 | 0.000000E+00 | 0.000000E+00 | 0.000000E+00 | 0.000000E+00 | 4.212750E-02 |
| a16 | 0.000000E+00 | 0.000000E+00 | 0.000000E+00 | 0.000000E+00 | 0.000000E+00 | 0.000000E+00 | -7.255029E-03 |
| No. | 42 | 51 | 52 | 61 | 62 | 71 | 72 |
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | -4.161110E-02 | 9.034658E-02 | 5.529162E-02 | -9.810577E-02 | -8.585175E-02 | -8.230615E-02 | -1.198301E-01 |
| a6 | -4.483817E-02 | -6.518265E-03 | 3.242262E-03 | -1.439272E-02 | -1.432875E-02 | 2.464045E-02 | 4.258111E-02 |
| a8 | -4.523228E-04 | -8.871140E-02 | -1.949880E-02 | -2.014569E-03 | 1.047863E-03 | -1.249356E-03 | -1.382121E-02 |
| a10 | 6.765534E-03 | 7.322089E-02 | 1.992706E-02 | 4.992201E-03 | -3.121322E-03 | 2.698487E-04 | 3.331859E-03 |
| a12 | 8.703248E-03 | -3.728953E-02 | -1.277942E-02 | -4.725123E-03 | 3.554895E-04 | -4.405351E-04 | -5.065440E-04 |
| a14 | -6.333423E-03 | 9.301990E-03 | 3.498570E-03 | 1.685481E-03 | 6.572882E-06 | 1.019550E-04 | 4.129126E-05 |
| a16 | 1.801529E-03 | 1.110159E-04 | -1.255268E-04 | -1.579939E-04 | -4.102058E-06 | -6.499931E-06 | -1.386835E-06 |

FIG. 25

| Fourth Example ||||||
|---|---|---|---|---|---|
| EFL=4.1078 mm || HFOV=37.9995 Degrees || TTL=5.3157 mm | Fno=1.6115 |
| No. | | Curvature Radius | Ape. Stop Lens Thickness Air Gap | Refractive Index | Abbe No. | Focal Length |
| | Object | INFINITY | INFINITY | | | |
| 11 | First Lens | 2.0479 | 0.5017 $T_1$ | 1.5445 | 55.9870 | 9.4637 |
| 12 | | 3.0979 | 0.1856 $G_{12}$ | | | |
| 80 | Ape. Stop | INFINITY | -0.0322 | | | |
| 21 | Second Lens | 2.3616 | 0.2720 $T_2$ | 1.6612 | 20.3683 | -7.4297 |
| 22 | | 1.5256 | 0.0700 $G_{23}$ | | | |
| 31 | Third Lens | 1.9929 | 0.4944 $T_3$ | 1.5445 | 55.9870 | 4.0164 |
| 32 | | 19.8289 | 0.3069 $G_{34}$ | | | |
| 41 | Fourth Lens | 13.4065 | 0.3105 $T_4$ | 1.6612 | 20.3683 | 44.3504 |
| 42 | | 24.2932 | 0.1799 $G_{45}$ | | | |
| 51 | Fifth Lens | -2.8496 | 0.6320 $T_5$ | 1.5445 | 55.9870 | 6.1988 |
| 52 | | -1.6687 | 0.0391 $G_{56}$ | | | |
| 61 | Sixth Lens | 2.6399 | 0.4061 $T_6$ | 1.5445 | 55.9870 | -29.3763 |
| 62 | | 2.1438 | 0.6773 $G_{67}$ | | | |
| 71 | Seventh Lens | -19.9758 | 0.3966 $T_7$ | 1.5445 | 55.9870 | -4.4122 |
| 72 | | 2.7602 | 0.1959 | | | |
| 90 | IR Filter | INFINITY | 0.2100 | 1.5168 | 64.1673 | |
| | | INFINITY | 0.4697 | | | |
| 91 | Image Plane | INFINITY | | | | |

FIG. 26

| No. | 11 | 12 | 21 | 22 | 31 | 32 | 41 |
|---|---|---|---|---|---|---|---|
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | 1.923729E-03 | 1.785290E-02 | -4.255029E-02 | -8.431157E-02 | -1.423367E-02 | -4.432652E-02 | -1.289035E-01 |
| a6 | -1.093690E-02 | -7.198626E-02 | -1.138832E-01 | -1.220173E-01 | -3.295503E-02 | 7.793370E-05 | -3.313411E-02 |
| a8 | 3.121742E-03 | 2.896875E-02 | 8.402236E-02 | 8.021174E-02 | -1.061308E-02 | 2.592937E-02 | -4.365790E-02 |
| a10 | -2.570821E-03 | -4.870156E-03 | -1.964071E-02 | -2.087855E-02 | 1.179084E-02 | -3.785295E-02 | 1.126635E-01 |
| a12 | 0.000000E+00 | 0.000000E+00 | 0.000000E+00 | 0.000000E+00 | -4.579163E-03 | 1.074496E-02 | -9.654707E-02 |
| a14 | 0.000000E+00 | 0.000000E+00 | 0.000000E+00 | 0.000000E+00 | 0.000000E+00 | 0.000000E+00 | 4.580517E-02 |
| a16 | 0.000000E+00 | 0.000000E+00 | 0.000000E+00 | 0.000000E+00 | 0.000000E+00 | 0.000000E+00 | -8.407825E-03 |
| No. | 42 | 51 | 52 | 61 | 62 | 71 | 72 |
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | -5.548046E-02 | 9.116759E-02 | 5.431629E-02 | -1.000215E-01 | -9.033946E-02 | -9.572267E-02 | -1.229744E-01 |
| a6 | -4.343283E-02 | -6.013936E-03 | 1.448421E-03 | -1.484403E-02 | -1.076724E-02 | 2.604977E-02 | 4.324633E-02 |
| a8 | -7.377999E-04 | -9.466576E-02 | -1.694361E-02 | -1.017711E-02 | 9.213878E-03 | -1.319663E-03 | -1.415091E-02 |
| a10 | 4.619852E-03 | 7.689170E-02 | 1.623200E-02 | 4.483027E-03 | -3.038491E-03 | 2.438279E-04 | 3.390425E-03 |
| a12 | 1.154624E-02 | -4.007106E-02 | -1.111492E-02 | -5.095734E-03 | 4.034439E-04 | -4.584183E-04 | -5.147596E-04 |
| a14 | -7.733620E-03 | 9.899967E-03 | 3.160407E-03 | 2.282778E-03 | 7.641297E-06 | 1.132190E-04 | 4.243299E-05 |
| a16 | 2.050275E-03 | 1.344212E-04 | -7.253477E-05 | -3.114180E-04 | -5.628067E-06 | -7.692882E-06 | -1.453959E-06 |

FIG. 27

| Fifth Example ||||||
|---|---|---|---|---|---|
| EFL=4.1035 mm | HFOV=37.9981 Degrees || TTL=5.3343 mm | | Fno=1.6059 |
| No. | | Curvature Radius | Ape. Stop Lens Thickness Air Gap | Refractive Index | Abbe No. | Focal Length |
| | Object | INFINITY | INFINITY | | | |
| 11 | First Lens | 2.1599 | 0.4005 $T_1$ | 1.5445 | 55.9870 | 11.0005 |
| 12 | | 3.1509 | 0.1586 $G_{12}$ | | | |
| 80 | Ape. Stop | INFINITY | -0.0244 | | | |
| 21 | Second Lens | 2.2593 | 0.2241 $T_2$ | 1.6612 | 20.3683 | -8.8023 |
| 22 | | 1.5667 | 0.0711 $G_{23}$ | | | |
| 31 | Third Lens | 1.9727 | 1.0756 $T_3$ | 1.5445 | 55.9870 | 4.0984 |
| 32 | | 13.3998 | 0.1929 $G_{34}$ | | | |
| 41 | Fourth Lens | 7.5061 | 0.3097 $T_4$ | 1.6612 | 20.3683 | 36.1270 |
| 42 | | 10.7226 | 0.2345 $G_{45}$ | | | |
| 51 | Fifth Lens | -2.9797 | 0.3833 $T_5$ | 1.5445 | 55.9870 | 6.7006 |
| 52 | | -1.7172 | 0.0847 $G_{56}$ | | | |
| 61 | Sixth Lens | 2.5230 | 0.2796 $T_6$ | 1.5445 | 55.9870 | -39.3214 |
| 62 | | 2.1694 | 0.4682 $G_{67}$ | | | |
| 71 | Seventh Lens | -15.7049 | 0.6006 $T_7$ | 1.5445 | 55.9870 | -4.2640 |
| 72 | | 2.7719 | 0.6104 | | | |
| 90 | IR Filter | INFINITY | 0.2100 | 1.5168 | 64.1673 | |
| | | INFINITY | 0.0549 | | | |
| 91 | Image Plane | INFINITY | | | | |

FIG. 28

| No. | 11 | 12 | 21 | 22 | 31 | 32 | 41 |
|---|---|---|---|---|---|---|---|
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | -4.556321E-03 | 1.008081E-02 | -3.816144E-02 | -7.213207E-02 | -7.594303E-03 | -3.522575E-02 | -8.884844E-02 |
| a6 | -1.468530E-02 | -7.869660E-02 | -1.091388E-01 | -1.167491E-01 | -3.725204E-02 | -1.001721E-02 | -2.523305E-02 |
| a8 | 1.525903E-03 | 3.239004E-02 | 7.506203E-02 | 8.284654E-02 | -4.748462E-04 | 2.578009E-02 | -4.706198E-02 |
| a10 | -2.558533E-03 | -5.834760E-03 | -1.607494E-02 | -2.215843E-02 | 1.349494E-02 | -3.074055E-02 | 1.108719E-01 |
| a12 | 0.000000E+00 | 0.000000E+00 | 0.000000E+00 | 0.000000E+00 | -5.017726E-03 | 8.420981E-03 | -9.644704E-02 |
| a14 | 0.000000E+00 | 0.000000E+00 | 0.000000E+00 | 0.000000E+00 | 0.000000E+00 | 0.000000E+00 | 4.124917E-02 |
| a16 | 0.000000E+00 | 0.000000E+00 | 0.000000E+00 | 0.000000E+00 | 0.000000E+00 | 0.000000E+00 | -6.685610E-03 |
| No. | 42 | 51 | 52 | 61 | 62 | 71 | 72 |
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | -3.115269E-02 | 7.921358E-02 | 9.331602E-02 | -7.548645E-02 | -8.467177E-02 | -9.101865E-02 | -1.131413E-01 |
| a6 | -5.000879E-02 | 1.796657E-03 | -1.133302E-02 | -2.455973E-02 | -1.623273E-02 | 2.259560E-02 | 4.059172E-02 |
| a8 | 3.156895E-05 | -9.195613E-03 | -9.498971E-03 | 1.605711E-03 | 9.528093E-03 | -1.006533E-03 | -1.362752E-02 |
| a10 | 4.894440E-03 | 7.524212E-02 | 2.281719E-02 | 6.485144E-03 | -2.971929E-03 | 4.494977E-04 | 3.390995E-03 |
| a12 | 1.133261E-02 | -3.181704E-02 | -1.474997E-02 | -4.521534E-03 | 3.859943E-04 | -4.190328E-04 | -5.423956E-04 |
| a14 | -7.657172E-03 | 7.960121E-03 | 4.839359E-03 | 1.189901E-03 | 3.357570E-06 | 9.776862E-05 | 4.773224E-05 |
| a16 | 1.818000E-03 | -7.998994E-04 | -6.197684E-04 | -1.193628E-04 | -4.119281E-06 | -7.152201E-06 | -1.778672E-06 |

FIG. 29

| Sixth Example |||||||
|---|---|---|---|---|---|---|
| EFL=3.8729 mm || HFOV=37.9978 Degrees || TTL=5.0626 mm | Fno=1.6014 ||
| No. | | Curvature Radius | Ape. Stop Lens Thickness Air Gap || Refractive Index | Abbe No. | Focal Length |
| | Object | INFINITY | INFINITY ||||
| 11 | First Lens | 2.1281 | 0.4681 | $T_1$ | 1.5445 | 55.9870 | 7.4113 |
| 12 | | 4.1377 | 0.1669 | $G_{12}$ ||||
| 80 | Ape. Stop | INFINITY | -0.0542 ||||
| 21 | Second Lens | 2.3897 | 0.2085 | $T_2$ | 1.6612 | 20.3683 | -7.8867 |
| 22 | | 1.5858 | 0.0727 | $G_{23}$ ||||
| 31 | Third Lens | 1.9086 | 0.4686 | $T_3$ | 1.5445 | 55.9870 | 4.8324 |
| 32 | | 6.2931 | 0.1964 | $G_{34}$ ||||
| 41 | Fourth Lens | 10.0617 | 0.6992 | $T_4$ | 1.6612 | 20.3683 | 69.8154 |
| 42 | | 12.4784 | 0.2166 | $G_{45}$ ||||
| 51 | Fifth Lens | -3.1107 | 0.4717 | $T_5$ | 1.5445 | 55.9870 | 5.1202 |
| 52 | | -1.5517 | 0.0702 | $G_{56}$ ||||
| 61 | Sixth Lens | 2.5960 | 0.3281 | $T_6$ | 1.5445 | 55.9870 | -33.6163 |
| 62 | | 2.1729 | 0.4587 | $G_{67}$ ||||
| 71 | Seventh Lens | -19.3501 | 0.3900 | $T_7$ | 1.5445 | 55.9870 | -4.2293 |
| 72 | | 2.6423 | 0.1845 ||||
| 90 | IR Filter | INFINITY | 0.2100 || 1.5168 | 64.1673 ||
| | | INFINITY | 0.5067 ||||
| 91 | Image Plane | INFINITY |||||

FIG. 30

| No. | 11 | 12 | 21 | 22 | 31 | 32 | 41 |
|---|---|---|---|---|---|---|---|
| K | 0.000000E+00 | 0.000000E+00 | 0.000000E+00 | 0.000000E+00 | 0.000000E+00 | 0.000000E+00 | 0.000000E+00 |
| A2 | 0.000000E+00 | 0.000000E+00 | 0.000000E+00 | 0.000000E+00 | 0.000000E+00 | 0.000000E+00 | 0.000000E+00 |
| a4 | 1.157555E-03 | 1.674639E-02 | -3.989009E-02 | -8.925156E-02 | -2.761588E-02 | -6.338083E-02 | -9.837380E-02 |
| a6 | -1.102475E-02 | -7.064649E-02 | -1.133878E-01 | -1.248903E-01 | -3.885202E-02 | -1.546793E-02 | -1.652596E-02 |
| a8 | 2.554410E-03 | 3.178107E-02 | 8.340462E-02 | 7.767378E-02 | -1.618381E-02 | 2.458495E-02 | -4.355626E-02 |
| a10 | -2.955081E-03 | -5.997980E-03 | -2.008609E-02 | -2.021336E-02 | 1.246933E-02 | -3.585129E-02 | 1.109281E-01 |
| a12 | 0.000000E+00 | 0.000000E+00 | 0.000000E+00 | 0.000000E+00 | -5.009726E-03 | 1.290052E-02 | -9.756963E-02 |
| a14 | 0.000000E+00 | 0.000000E+00 | 0.000000E+00 | 0.000000E+00 | 0.000000E+00 | 0.000000E+00 | 4.540567E-02 |
| a16 | 0.000000E+00 | 0.000000E+00 | 0.000000E+00 | 0.000000E+00 | 0.000000E+00 | 0.000000E+00 | -8.200554E-03 |

| No. | 42 | 51 | 52 | 61 | 62 | 71 | 72 |
|---|---|---|---|---|---|---|---|
| K | 0.000000E+00 | 0.000000E+00 | 0.000000E+00 | 0.000000E+00 | 0.000000E+00 | 0.000000E+00 | 0.000000E+00 |
| a2 | 0.000000E+00 | 0.000000E+00 | 0.000000E+00 | 0.000000E+00 | 0.000000E+00 | 0.000000E+00 | 0.000000E+00 |
| a4 | -4.275576E-03 | 1.004734E-01 | 9.049029E-02 | -1.048051E-01 | -8.049489E-02 | -6.135458E-02 | -1.213470E-01 |
| a6 | -3.424831E-02 | 1.794844E-03 | 1.601516E-02 | -1.230290E-02 | -1.908743E-02 | 7.307493E-03 | 3.930590E-02 |
| a8 | -2.463774E-04 | -8.715101E-02 | -1.172906E-02 | -5.717321E-03 | 1.050247E-02 | 3.174807E-03 | -1.303677E-02 |
| a10 | 2.244774E-03 | 8.034315E-02 | 1.714919E-02 | 7.320140E-03 | -2.915535E-03 | 4.780498E-05 | 3.305915E-03 |
| a12 | 1.011724E-02 | -3.996923E-02 | -1.159378E-02 | -6.228203E-03 | 1.735339E-04 | -5.288913E-04 | -5.316112E-04 |
| a14 | -8.779319E-03 | 9.011740E-03 | 3.233606E-03 | 1.792945E-03 | 7.232941E-05 | 1.054952E-04 | 4.564034E-05 |
| a16 | 2.197403E-03 | -6.440603E-04 | 2.966313E-05 | -1.601879E-04 | -1.415530E-05 | -4.859946E-06 | -1.654311E-06 |

FIG. 31

| Seventh Example ||||||
|---|---|---|---|---|---|
| EFL=4.2062 mm | HFOV=37.9627 Degrees || TTL=5.5733 mm | Fno=1.6110 ||
| No. | | Curvature Radius | Ape. Stop Lens Thickness Air Gap | Refractive Index | Abbe No. | Focal Length |
| | Object | INFINITY | INFINITY | | | |
| 11 | First Lens | 2.1558 | 0.5825 $T_1$ | 1.5445 | 55.9870 | 9.3133 |
| 12 | | 3.3837 | 0.1708 $G_{12}$ | | | |
| 80 | Ape. Stop | INFINITY | -0.0109 | | | |
| 21 | Second Lens | 2.2991 | 0.2409 $T_2$ | 1.6612 | 20.3683 | -8.7915 |
| 22 | | 1.5823 | 0.0688 $G_{23}$ | | | |
| 31 | Third Lens | 2.0652 | 0.6289 $T_3$ | 1.5445 | 55.9870 | 4.6059 |
| 32 | | 10.2851 | 0.2568 $G_{34}$ | | | |
| 41 | Fourth Lens | 11.2420 | 0.3545 $T_4$ | 1.6612 | 20.3683 | 187.0184 |
| 42 | | 12.1998 | 0.2368 $G_{45}$ | | | |
| 51 | Fifth Lens | -2.9985 | 0.6476 $T_5$ | 1.5445 | 55.9870 | 5.9210 |
| 52 | | -1.6747 | 0.0329 $G_{56}$ | | | |
| 61 | Sixth Lens | 2.7404 | 0.4419 $T_6$ | 1.6428 | 22.4373 | -44.0896 |
| 62 | | 2.3420 | 0.4861 $G_{67}$ | | | |
| 71 | Seventh Lens | 308.3190 | 0.4389 $T_7$ | 1.5445 | 55.9870 | -5.1092 |
| 72 | | 2.7646 | 0.5000 | | | |
| 90 | IR Filter | INFINITY | 0.2100 | 1.5168 | 64.1673 | |
| | | INFINITY | 0.2868 | | | |
| 91 | Image Plane | INFINITY | | | | |

FIG. 32

| No. | 11 | 12 | 21 | 22 | 31 | 32 | 41 |
|-----|-----|-----|-----|-----|-----|-----|-----|
| K   | 0.000000E+00 | 0.000000E+00 | 0.000000E+00 | 0.000000E+00 | 0.000000E+00 | 0.000000E+00 | 0.000000E+00 |
| A2  | 0.000000E+00 | 0.000000E+00 | 0.000000E+00 | 0.000000E+00 | 0.000000E+00 | 0.000000E+00 | 0.000000E+00 |
| a4  | 1.254672E-03 | 1.120924E-02 | -3.783000E-02 | -7.562976E-02 | -2.352442E-02 | -3.057012E-02 | -7.338253E-02 |
| a6  | -9.769804E-03 | -7.337876E-02 | -1.187452E-01 | -1.193552E-01 | -2.488592E-02 | -1.268821E-02 | -3.450282E-02 |
| a8  | 3.225215E-03 | 3.165710E-02 | 8.064574E-02 | 8.279545E-02 | -7.569654E-03 | 3.029297E-02 | -4.477859E-02 |
| a10 | -2.093994E-03 | -5.188826E-03 | -1.618635E-02 | -2.181595E-02 | 8.881934E-03 | -3.500936E-02 | 1.080082E-01 |
| a12 | -1.135525E-06 | -2.642045E-06 | 1.413160E-05 | -1.476570E-05 | -4.602757E-03 | 8.903312E-03 | -9.690678E-02 |
| a14 | -1.482338E-06 | -9.997135E-07 | 9.912173E-06 | -8.903800E-06 | 7.488553E-06 | 1.080215E-05 | 4.183873E-02 |
| a16 | -1.212237E-06 | -3.375249E-07 | 6.466276E-06 | -4.995444E-06 | 2.673662E-06 | 6.941490E-06 | -6.639142E-03 |
| No. | 42 | 51 | 52 | 61 | 62 | 71 | 72 |
| K   | 0.000000E+00 | 0.000000E+00 | 0.000000E+00 | 0.000000E+00 | 0.000000E+00 | 0.000000E+00 | 0.000000E+00 |
| A2  | 0.000000E+00 | 0.000000E+00 | 0.000000E+00 | 0.000000E+00 | 0.000000E+00 | 0.000000E+00 | 0.000000E+00 |
| a4  | -2.441441E-02 | 6.330126E-02 | 4.807904E-02 | -6.616724E-02 | -6.455618E-02 | -1.023218E-01 | -1.303404E-01 |
| a6  | -3.665256E-02 | 1.204317E-03 | -1.518949E-03 | -1.856608E-02 | -1.650532E-02 | 2.534596E-02 | 4.372165E-02 |
| a8  | -1.324895E-03 | -7.587236E-02 | -1.624705E-02 | 1.524895E-03 | 1.054629E-02 | -6.025853E-04 | -1.366648E-02 |
| a10 | 5.550405E-03 | 7.011341E-02 | 2.268060E-02 | 6.097905E-03 | -3.165987E-03 | 2.998537E-04 | 3.277388E-03 |
| a12 | 6.320734E-03 | -3.412613E-02 | -1.226045E-02 | -4.634953E-03 | 3.665276E-04 | -4.490331E-04 | -5.011793E-04 |
| a14 | -6.008620E-03 | 8.486482E-03 | 3.345647E-03 | 1.189806E-03 | 1.000240E-05 | 1.012553E-04 | 4.056527E-05 |
| a16 | 1.582874E-03 | -6.234389E-04 | -2.794562E-04 | -9.058516E-05 | -3.470495E-06 | -6.721148E-06 | -1.335084E-06 |

FIG. 33

| Example | First | Second | Third | Fourth | Fifth | Sixth | Seventh |
|---|---|---|---|---|---|---|---|
| T1 | 0.567 | 0.546 | 0.561 | 0.502 | 0.400 | 0.468 | 0.583 |
| G12 | 0.149 | 0.192 | 0.146 | 0.153 | 0.134 | 0.113 | 0.160 |
| T2 | 0.231 | 0.237 | 0.224 | 0.272 | 0.224 | 0.209 | 0.241 |
| G23 | 0.070 | 0.085 | 0.063 | 0.070 | 0.071 | 0.073 | 0.069 |
| T3 | 0.699 | 0.662 | 0.532 | 0.494 | 1.076 | 0.469 | 0.629 |
| G34 | 0.209 | 0.236 | 0.321 | 0.307 | 0.193 | 0.196 | 0.257 |
| T4 | 0.329 | 0.313 | 0.335 | 0.310 | 0.310 | 0.699 | 0.354 |
| G45 | 0.269 | 0.220 | 0.187 | 0.180 | 0.235 | 0.217 | 0.237 |
| T5 | 0.637 | 0.516 | 0.645 | 0.632 | 0.383 | 0.472 | 0.648 |
| G56 | 0.038 | 0.162 | 0.039 | 0.039 | 0.085 | 0.070 | 0.033 |
| T6 | 0.504 | 0.467 | 0.437 | 0.406 | 0.280 | 0.328 | 0.442 |
| G67 | 0.505 | 0.507 | 0.465 | 0.677 | 0.468 | 0.459 | 0.486 |
| T7 | 0.416 | 0.370 | 0.519 | 0.397 | 0.601 | 0.390 | 0.439 |
| G7F | 0.390 | 0.577 | 0.452 | 0.196 | 0.610 | 0.184 | 0.500 |
| TF | 0.210 | 0.210 | 0.210 | 0.210 | 0.210 | 0.210 | 0.210 |
| GFP | 0.337 | 0.098 | 0.231 | 0.470 | 0.055 | 0.507 | 0.287 |
| $\upsilon 1$ | 55.987 | 55.987 | 55.987 | 55.987 | 55.987 | 55.987 | 55.987 |
| $\upsilon 2$ | 20.368 | 20.368 | 20.368 | 20.368 | 20.368 | 20.368 | 20.368 |
| $\upsilon 3$ | 55.987 | 55.987 | 55.987 | 55.987 | 55.987 | 55.987 | 55.987 |
| $\upsilon 4$ | 20.368 | 20.368 | 20.368 | 20.368 | 20.368 | 20.368 | 20.368 |
| $\upsilon 5$ | 55.987 | 55.987 | 55.987 | 55.987 | 55.987 | 55.987 | 55.987 |
| $\upsilon 6$ | 55.987 | 55.987 | 55.987 | 55.987 | 55.987 | 55.987 | 22.437 |
| $\upsilon 7$ | 55.987 | 55.987 | 55.987 | 55.987 | 55.987 | 55.987 | 55.987 |
| AAG | 1.240 | 1.402 | 1.221 | 1.427 | 1.186 | 1.127 | 1.241 |
| ALT | 3.383 | 3.112 | 3.253 | 3.013 | 3.273 | 3.034 | 3.335 |
| BFL | 0.937 | 0.885 | 0.893 | 0.876 | 0.875 | 0.901 | 0.997 |
| TTL | 5.560 | 5.399 | 5.366 | 5.316 | 5.334 | 5.063 | 5.573 |
| EFL | 4.241 | 4.138 | 4.132 | 4.108 | 4.104 | 3.873 | 4.206 |
| TL | 4.623 | 4.514 | 4.474 | 4.440 | 4.459 | 4.161 | 4.577 |
| Tmin | 0.231 | 0.237 | 0.224 | 0.272 | 0.224 | 0.209 | 0.241 |
| Tmax | 0.699 | 0.662 | 0.645 | 0.632 | 1.076 | 0.699 | 0.648 |
| Gmax | 0.505 | 0.507 | 0.465 | 0.677 | 0.468 | 0.459 | 0.486 |

FIG. 34

| Example | First | Second | Third | Fourth | Fifth | Sixth | Seventh |
|---|---|---|---|---|---|---|---|
| 5υ1−(υ3+υ4+υ5+υ6+υ7) | 35.619 | 35.619 | 35.619 | 35.619 | 35.619 | 35.619 | 69.168 |
| TTL/AAG | 4.484 | 3.850 | 4.395 | 3.726 | 4.499 | 4.491 | 4.490 |
| ALT/Gmax | 6.701 | 6.136 | 6.991 | 4.449 | 6.991 | 6.615 | 6.861 |
| TL/Tmin | 20.000 | 19.014 | 19.990 | 16.323 | 19.900 | 19.958 | 18.997 |
| TTL/Gmax | 11.012 | 10.647 | 11.533 | 7.848 | 11.393 | 11.038 | 11.465 |
| Tmax/G67 | 1.385 | 1.305 | 1.385 | 0.933 | 2.297 | 1.524 | 1.332 |
| EFL/BFL | 4.527 | 4.675 | 4.629 | 4.692 | 4.688 | 4.297 | 4.220 |
| (T5+T6+T7)/(T1+T2+T3) | 1.040 | 0.936 | 1.215 | 1.131 | 0.743 | 1.039 | 1.052 |
| ALT/AAG | 2.728 | 2.219 | 2.664 | 2.112 | 2.761 | 2.692 | 2.687 |
| TL/T4 | 14.061 | 14.400 | 13.352 | 14.301 | 14.399 | 5.952 | 12.911 |
| TL/BFL | 4.935 | 5.100 | 5.012 | 5.071 | 5.094 | 4.618 | 4.591 |
| Gmax/Tmin | 2.184 | 2.136 | 2.079 | 2.490 | 2.090 | 2.200 | 2.018 |
| Tmax/T7 | 1.680 | 1.789 | 1.242 | 1.593 | 1.791 | 1.793 | 1.476 |
| EFL/G67 | 8.401 | 8.160 | 8.880 | 6.065 | 8.764 | 8.444 | 8.653 |
| (T1+T5)/T2 | 5.208 | 4.472 | 5.387 | 4.168 | 3.498 | 4.507 | 5.106 |
| T6/G34 | 2.415 | 1.977 | 1.363 | 1.323 | 1.449 | 1.670 | 1.720 |
| (G12+G23+G56)/G45 | 0.955 | 2.000 | 1.330 | 1.460 | 1.236 | 1.180 | 1.105 |

FIG. 35

OPTICAL LENS SET

CROSS REFERENCE TO RELATED APPLICATIONS

This application is a continuation of the application, Ser. No. 15/441,253, filed on Feb. 24, 2017, which claims priority to Chinese Patent Application No. 201611254134.1, filed on Dec. 30, 2016. The contents thereof are included herein by reference.

BACKGROUND OF THE INVENTION

1. Field of the Invention

The present invention generally relates to an optical imaging lens set. Specifically speaking, the present invention is directed to an optical imaging lens set for use in portable electronic devices such as mobile phones, cameras, tablet personal computers, or personal digital assistants (PDA) for taking pictures and for recording videos.

2. Description of the Prior Art

The specifications of portable electronic devices change all the time and the key element—optical imaging lens set develops variously so a good imaging quality is needed as well as a smaller size. As far as the imaging quality is concerned, the demands for better imaging quality are getting higher and higher with the development of optical technology. In addition to the thinner lens sizes, the imaging quality and performance are critical as well in the optical lens design field.

To take an optical imaging lens set of seven lens elements for example, there is a longer distance from the object-side surface of the first lens element to an image plane in the conventional design and it is adverse to the thinner design of the cell phones and digital cameras. The designing of the optical lens is not just scaling down the optical lens which has good optical performance, but also needs to consider the material characteristics and satisfy some practical requirements like assembly yield.

Accordingly, it is more difficult to diminish a mini-lens than to diminish a conventional one. Therefore, how to reduce the total length of a photographic device, but still maintain good optical performance under dim light background, is an important objective to research.

SUMMARY OF THE INVENTION

In light of the above, the present invention proposes an optical imaging lens set of seven lens elements which is shorter in total length, technically possible, has ensured imaging quality and has enhanced image definition. The optical imaging lens set of seven lens elements of the present invention from an object side toward an image side in order along an optical axis has a first lens element, a second lens element, a third lens element, a fourth lens element, a fifth lens element, a sixth lens element and a seventh lens element. Each first lens element, second lens element, third lens element, fourth lens element, fifth lens element, sixth lens element and seventh lens element respectively has an object-side surface which faces toward an object side as well as an image-side surface which faces toward an image side.

The first lens element has an image-side surface with a concave portion in a vicinity of the optical-axis. The sixth lens element has negative refractive power and an image-side surface with a concave portion in a vicinity of the optical-axis. The seventh lens element has negative refractive power. The optical imaging lens set exclusively has the above-mentioned seven lens elements with refractive power. An Abbe number of the first lens element is $\upsilon 1$, an Abbe number of the third lens element is $\upsilon 3$, an Abbe number of the fourth lens element is $\upsilon 4$, an Abbe number of the fifth lens element is $\upsilon 5$, an Abbe number of the sixth lens element is $\upsilon 6$ and an Abbe number of the seventh lens element is $\upsilon 7$ to satisfy $5 \leq 5\upsilon 1 - (\upsilon 3 + \upsilon 4 + \upsilon 5 + \upsilon 6 + \upsilon 7)$.

In the optical imaging lens set of seven lens elements of the present invention, TTL is a distance from the object-side surface of the first lens element to an image plane and AAG is a sum of all six air gaps between each lens elements from the first lens element to the seventh lens element along the optical axis to satisfy $TTL/AAG \leq 4.5$.

In the optical imaging lens set of seven lens elements of the present invention, ALT is a total thickness of all seven lens elements and Gmax is the maximal air gap among the first lens element and the seventh lens element to satisfy $ALT/Gmax \leq 7$.

In the optical imaging lens set of seven lens elements of the present invention, TL is a distance between the object-side surface of the first lens element and the image-side surface of the seventh lens element along the optical axis and Tmin is the minimal lens element thickness among the first lens element and the seventh lens element to satisfy $TL/Tmin \leq 20$.

The optical imaging lens set of seven lens elements of the present invention satisfies $TTL/Gmax \leq 11.9$.

In the optical imaging lens set of seven lens elements of the present invention, Tmax is the maximal lens element thickness among the first lens element and the seventh lens element and an air gap G67 between the sixth lens element and the seventh lens element along the optical axis to satisfy $Tmax/G67 \leq 2.3$.

In the optical imaging lens set of seven lens elements of the present invention, EFL is an effective focal length of the optical imaging lens set and BFL is a distance between the image-side surface of the seventh lens element and an image plane along the optical axis to satisfy $EFL/BFL \leq 4.7$.

In the optical imaging lens set of seven lens elements of the present invention, the first lens element has a first lens element thickness T1 along the optical axis, the second lens element has a second lens element thickness T2 along the optical axis, the third lens element has a third lens element thickness T3 along the optical axis, the fifth lens element has a fifth lens element thickness T5 along the optical axis, the sixth lens element has a sixth lens element thickness T6 along the optical axis and the seventh lens element has a seventh lens element thickness T7 along the optical axis to satisfy $(T5+T6+T7)/(T1+T2+T3) \leq 1.3$.

The optical imaging lens set of seven lens elements of the present invention satisfies $ALT/AAG \leq 2.8$.

In the optical imaging lens set of seven lens elements of the present invention, the fourth lens element has a fourth lens element thickness T4 along the optical axis to satisfy $TL/T4 \leq 14.4$.

The present invention proposes another optical imaging lens set of seven lens elements which is shorter in total length, technically possible, has ensured imaging quality and has enhanced image definition. The optical imaging lens set of seven lens elements of the present invention from an object side toward an image side in order along an optical axis has a first lens element, a second lens element, a third lens element, a fourth lens element, a fifth lens element, a sixth lens element and a seventh lens element. Each first lens element, second lens element, third lens element, fourth lens element, fifth lens element, sixth lens element and seventh lens element respectively has an object-side surface which faces toward an object side as well as an image-side surface which faces toward an image side.

The first lens element has an image-side surface with a concave portion in a vicinity of the optical-axis. The fifth lens element has an object-side surface with a concave portion in a vicinity of the optical-axis. The sixth lens element has negative refractive power and an image-side surface with a concave portion in a vicinity of the optical-axis. An Abbe number of the first lens element is $\upsilon 1$, an Abbe number of the third lens element is $\upsilon 3$, an Abbe number of the fourth lens element is $\upsilon 4$, an Abbe number of the fifth lens element is $\upsilon 5$, an Abbe number of the sixth lens element is $\upsilon 6$ and an Abbe number of the seventh lens element is $\upsilon 7$ to satisfy $5 \leq 5\upsilon 1-(\upsilon 3+\upsilon 4+\upsilon 5+\upsilon 6+\upsilon 7)$.

In the optical imaging lens set of seven lens elements of the present invention, TTL is a distance from the object-side surface of the first lens element to an image plane and AAG is a sum of all six air gaps between each lens elements from the first lens element to the seventh lens element along the optical axis to satisfy TTL/AAG≤4.5.

In the optical imaging lens set of seven lens elements of the present invention, ALT is a total thickness of all seven lens elements and Gmax is the maximal air gap among the first lens element and the seventh lens element to satisfy ALT/Gmax≤7.

In the optical imaging lens set of seven lens elements of the present invention, TL is a distance between the object-side surface of the first lens element and the image-side surface of the seventh lens element along the optical axis and BFL is a distance between the image-side surface of the seventh lens element and an image plane along the optical axis to satisfy TL/BFL≤5.1.

In the optical imaging lens set of seven lens elements of the present invention, Tmin is the minimal lens element thickness among the first lens element and the seventh lens element to satisfy Gmax/Tmin≤2.5.

In the optical imaging lens set of seven lens elements of the present invention, Tmax is the maximal lens element thickness among the first lens element and the seventh lens element and the seventh lens element has a seventh lens element thickness T7 along the optical axis to satisfy Tmax/T7≤1.8.

In the optical imaging lens set of seven lens elements of the present invention, EFL is an effective focal length of the optical imaging lens set and an air gap G67 between the sixth lens element and the seventh lens element along the optical axis to satisfy EFL/G67≤13.

In the optical imaging lens set of seven lens elements of the present invention, the first lens element has a first lens element thickness T1 along the optical axis, the second lens element has a second lens element thickness T2 along the optical axis and the fifth lens element has a fifth lens element thickness T5 along the optical axis to satisfy (T1+T5)/T2≤5.5.

In the optical imaging lens set of seven lens elements of the present invention, the sixth lens element has a sixth lens element thickness T6 along the optical axis and an air gap G34 between the third lens element and the fourth lens element along the optical axis to satisfy T6/G34≤10.

In the optical imaging lens set of seven lens elements of the present invention, an air gap G12 between the first lens element and the second lens element along the optical axis, an air gap G23 between the second lens element and the third lens element along the optical axis, an air gap G45 between the fourth lens element and the fifth lens element along the optical axis and an air gap G56 between the fifth lens element and the sixth lens element along the optical axis satisfy (G12+G23+G56)/G45≤2.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its circular periphery of one lens element.

FIG. 6 illustrates a first example of the optical imaging lens set of the present invention.

FIG. 7A illustrates the longitudinal spherical aberration on the image plane of the first example.

FIG. 7B illustrates the astigmatic aberration on the sagittal direction of the first example.

FIG. 7C illustrates the astigmatic aberration on the tangential direction of the first example.

FIG. 7D illustrates the distortion aberration of the first example.

FIG. 10 illustrates a third example of the optical imaging lens set of seven lens elements of the present invention.

FIG. 11A illustrates the longitudinal spherical aberration on the image plane of the third example.

FIG. 11B illustrates the astigmatic aberration on the sagittal direction of the third example.

FIG. 11C illustrates the astigmatic aberration on the tangential direction of the third example.

FIG. 11D illustrates the distortion aberration of the third example.

FIG. 20 shows the optical data of the first example of the optical imaging lens set.

FIG. 21 shows the aspheric surface data of the first example.

FIG. 22 shows the optical data of the second example of the optical imaging lens set.

FIG. 23 shows the aspheric surface data of the second example.

FIG. 24 shows the optical data of the third example of the optical imaging lens set.

FIG. 25 shows the aspheric surface data of the third example.

FIG. 26 shows the optical data of the fourth example of the optical imaging lens set.

FIG. 27 shows the aspheric surface data of the fourth example.

FIG. 28 shows the optical data of the fifth example of the optical imaging lens set.

FIG. 29 shows the aspheric surface data of the fifth example.

FIG. 30 shows the optical data of the sixth example of the optical imaging lens set.

FIG. 31 shows the aspheric surface data of the sixth example.

FIG. 32 shows the optical data of the seventh example of the optical imaging lens set.

FIG. 33 shows the aspheric surface data of the seventh example.

FIG. 34 shows some important ratios in the examples.

FIG. 35 shows some important ratios in the examples.

DETAILED DESCRIPTION

Figure 8:
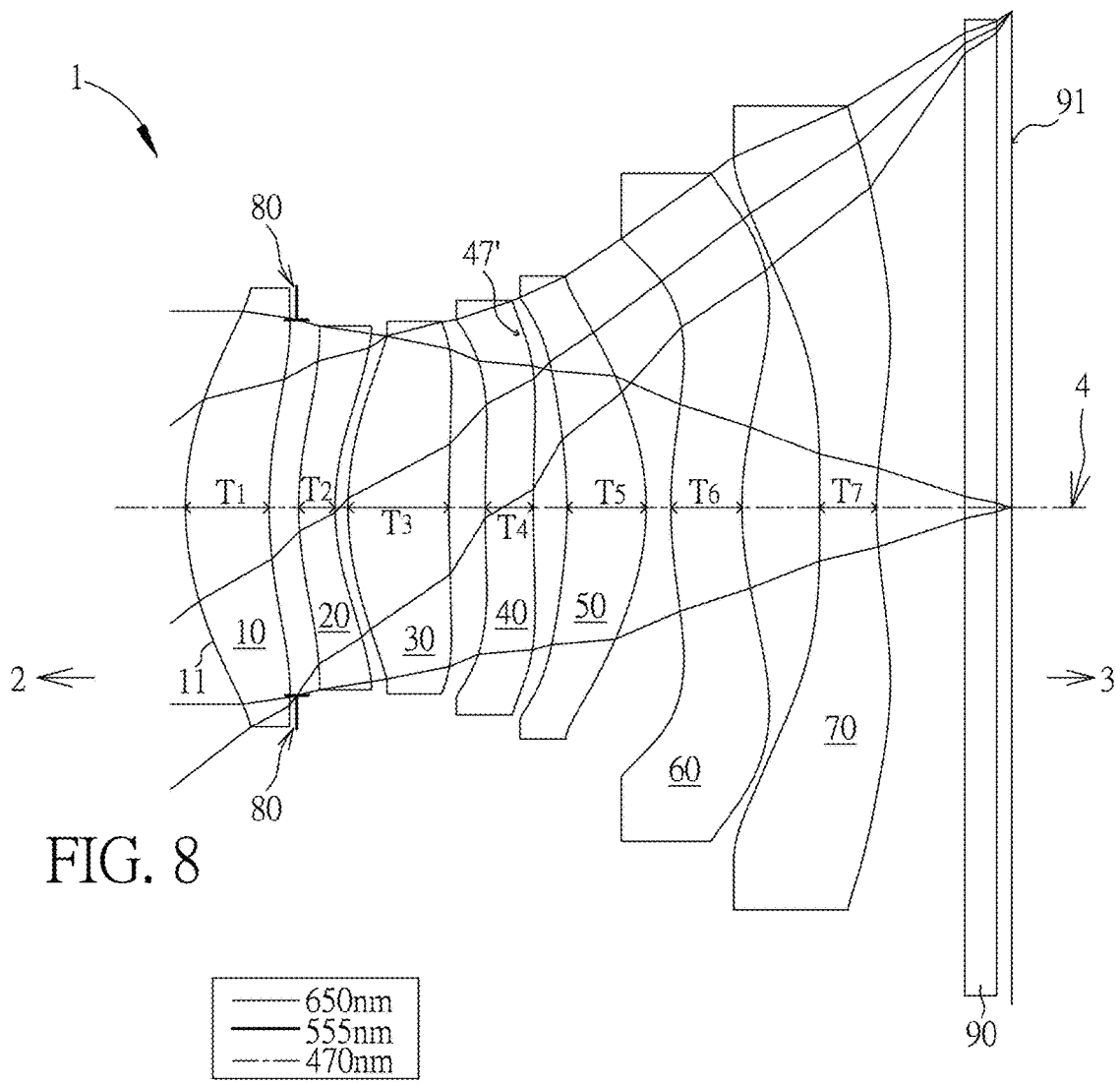
FIG. 8 illustrates a second example of the optical imaging lens set of seven lens elements of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, optical axis is "I" and the lens element is symmetrical with respect to the optical axis I. The region A that near the optical axis and for light to pass through is the region in a vicinity of the optical axis, and the region C that the marginal ray passing through is the region in a vicinity of a certain lens element's circular periphery. In addition, the lens element may include an extension part E for the lens element to be installed in an optical imaging lens set (that is the region outside the region C perpendicular to the optical axis). Ideally speaking, no light would pass through the extension part, and the actual structure and shape of the extension part is not limited to this and may have other variations. For the reason of simplicity, the extension part is not illustrated in the following examples. More, precisely, the method for determining the surface shapes or the region in a vicinity of the optical axis, the region in a vicinity of its circular periphery and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the $N^{th}$ conversion point (farthest one to the optical axis within the scope of the clear aperture of the surface). The portion of a surface of the lens element between the middle point and the first conversion point is defined as the portion in a vicinity of the optical axis.

The portion located radially outside of the $N^{th}$ conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions.

Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of seven lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a seventh lens element 70, a filter 90 and an image plane 91. Generally speaking, the first lens element 10, the second lens element 20, the third lens element 30, the fourth lens element 40, the fifth lens element 50, the sixth lens element 60 and the seventh lens element 70 may be made of a transparent plastic material but the present invention is not limited to this, and each has an appropriate refractive power. There are exclusively seven lens elements, which means the first lens element 10, the second lens element 20, the third lens element 30, the fourth lens element 40, the fifth lens element 50, the sixth lens element 60 and the seventh lens element 70, with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the first lens element 10 and the second lens element 20. When light emitted or reflected by an object (not shown) which is located at the object side 2 enters the optical imaging lens set 1 of the present invention, it forms a clear and sharp image on the image plane 91 at the image side 3 after passing through the first lens element 10, the aperture stop 80, the second lens element 20, the third lens element 30, the fourth lens element 40, the fifth lens element 50, the sixth lens element 60, the seventh lens element 70 and the filter 90. In one embodiments of the present invention, the optional filter 90 may be a filter of various suitable functions, for example, the filter 90 may be an infrared cut filter (IR cut filter), placed between the image-side surface 72 of the seventh lens element 70 and the image plane 91.

Each lens element in the optical imaging lens set 1 of the present invention has an object-side surface facing toward the object side 2 as well as an image-side surface facing toward the image side 3. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; the seventh lens element 70 has an object-side surface 71 and an image-side surface 72. In addition, each object-side surface and image-side surface in the optical imaging lens set 1 of the present invention has a part (or portion) in a vicinity of its circular periphery (circular periphery part) away from the optical axis 4 as well as a part in a vicinity of the optical axis (optical axis part) close to the optical axis 4.

Each lens element in the optical imaging lens set 1 of the present invention further has a central thickness T on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7. Therefore, the total thickness of all the lens elements in the optical imaging lens set 1 along the optical axis 4 is ALT=T1+T2+T3+T4+T5+T6+T7.

In addition, between two adjacent lens elements in the optical imaging lens set 1 of the present invention there may be an air gap along the optical axis 4. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50, an air gap G56 disposed between the fifth lens element 50 and the sixth lens element 60 as well as an air gap G67 disposed between the sixth lens element 60 and the seventh lens element 70. Therefore, the sum of total four air gaps between adjacent lens elements from the first lens element 10 to the sixth lens element 60 along the optical axis 4 is AAG=G12+G23+G45+G56+G67.

In addition, the distance from the object-side surface 11 of the first lens element 10 to the image-side surface 72 of the seventh lens element 70 along the optical axis 4 is TL. The distance between the object-side surface 11 of the first lens element 10 to the image plane 91, namely the total length of the optical imaging lens set along the optical axis 4 is TTL; the effective focal length of the optical imaging lens set is EFL; the distance between the image-side surface 72 of the seventh lens element 70 and the image plane 91 along the optical axis 4 is BFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the focal length of the seventh lens element 70 is f7; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the refractive index of the seventh lens element 70 is n7; the Abbe number of the first lens element 10 is υ1; the Abbe number of the second lens element 20 is υ2; the Abbe number of the third lens element 30 is υ3; and the Abbe number of the fourth lens element 40 is υ4; the Abbe number of the fifth lens element 50 is υ5; the Abbe number of the sixth lens element 60 is υ6; and the Abbe number of the seventh lens element 70 is υ7.

FIRST EXAMPLE

Please refer to FIG. 6 which illustrates the first example of the optical imaging lens set 1 of the present invention. Please refer to FIG. 7A for the longitudinal spherical aberration on the image plane 91 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stands for "image height", which is 3.241 mm.

The optical imaging lens set 1 of the first example exclusively has seven lens elements 10 to 70 with refractive power. The optical imaging lens set 1 also has a filter 90, an aperture stop 80, and an image plane 91. The aperture stop 80 is provided between the first lens element 10 and the second lens element 20. The filter 90 may be used for preventing specific wavelength light (such as the infrared light) reaching the image plane to adversely affect the imaging quality.

The first lens element 10 has positive refractive power. The object-side surface 11 facing toward the object side 2 has a convex part 13 in the vicinity of the optical axis and a convex part 14 in a vicinity of its circular periphery. The image-side surface 12 facing toward the image side 3 has a concave part 16 in the vicinity of the optical axis and a convex part 17 in a vicinity of its circular periphery. Besides, both the object-side surface 11 and the image-side 12 of the first lens element 10 are aspherical surfaces.

The second lens element 20 has negative refractive power. The object-side surface 21 facing toward the object side 2 has a convex part 23 in the vicinity of the optical axis and a convex part 24 in a vicinity of its circular periphery. The image-side surface 22 facing toward the image side 3 has a concave part 26 in the vicinity of the optical axis and a concave part 27 in a vicinity of its circular periphery. Besides, both the object-side surface 21 and the image-side 22 of the second lens element 20 are aspherical surfaces.

The third lens element 30 has positive refractive power. The object-side surface 31 facing toward the object side 2 has a convex part 33 in the vicinity of the optical axis and a convex part 34 in a vicinity of its circular periphery. The image-side surface 32 facing toward the image side 3 has a concave part 36 in the vicinity of the optical axis and a convex part 37 in a vicinity of its circular periphery. The object-side surface 31 and the image-side 32 of the third lens element 30 are aspherical surfaces.

The fourth lens element 40 has positive refractive power. The object-side surface 41 facing toward the object side 2 has a convex part 43 in the vicinity of the optical axis and a concave part 44 in a vicinity of its circular periphery. The image-side surface 42 facing toward the image side 3 has a concave part 46 in the vicinity of the optical axis and a concave part 47 in a vicinity of its circular periphery. The object-side surface 41 and the image-side 42 of the fourth lens element 40 are aspherical surfaces.

The fifth lens element 50 has positive refractive power. The object-side surface 51 facing toward the object side 2 has a concave part 53 in the vicinity of the optical axis and a concave part 54 in a vicinity of its circular periphery. The image-side surface 52 facing toward the image side 3 has a convex part 56 in the vicinity of the optical axis and a convex part 57 in a vicinity of its circular periphery. Besides, at least one of the object-side surface 51 and the image-side 52 of the fifth lens element 50 is an aspherical surface.

The sixth lens element 60 has negative refractive power. The object-side surface 61 facing toward the object side 2 has a convex part 63 in the vicinity of the optical axis and a concave part 64 in a vicinity of its circular periphery. The image-side surface 62 facing toward the image side 3 has a concave part 66 in the vicinity of the optical axis and a convex part 67 in a vicinity of its circular periphery. Both the object-side surface 61 and the image-side 62 of the sixth lens element 60 are aspherical surfaces.

The seventh lens element 70 has negative refractive power. The object-side surface 71 facing toward the object side 2 has a concave part 73 in the vicinity of the optical axis and a concave part 74 in a vicinity of its circular periphery. The image-side surface 62 facing toward the image side 3 has a concave part 76 in the vicinity of the optical axis and a convex part 77 in a vicinity of its circular periphery. Both the object-side surface 71 and the image-part 77 of the seventh lens element 70 are aspherical surfaces. The filter 90 is disposed between the image-part 77 of the seventh lens element 70 and the image plane 91.

In the first lens element 10, the second lens element 20, the third lens element 30, the fourth lens element 40, the fifth lens element 50, the sixth lens element 60 and the seventh lens element 70 of the optical imaging lens element 1 of the present invention, there are 14 surfaces, such as the object-side surfaces 11/21/31/41/51/61/71 and the image-side surfaces 12/22/32/42/52/62/72. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the $i^{th}$ order.

The optical data of the first example of the optical imaging lens set 1 are shown in FIG. 20 while the aspheric surface data are shown in FIG. 21. In the present examples of the optical imaging lens set, the f-number of the entire optical lens element system is Fno, EFL is the effective focal length, HFOV stands for the half field of view which is half of the field of view of the entire optical lens element system, and the unit for the curvature radius, the thickness and the focal length is in millimeters (mm). TTL is 5.5600 mm. Fno is 1.6239. The image height is 3.241 mm. HFOV is 38.0038 degrees.

SECOND EXAMPLE

Figures 9A, 9B, 9C, 9D:
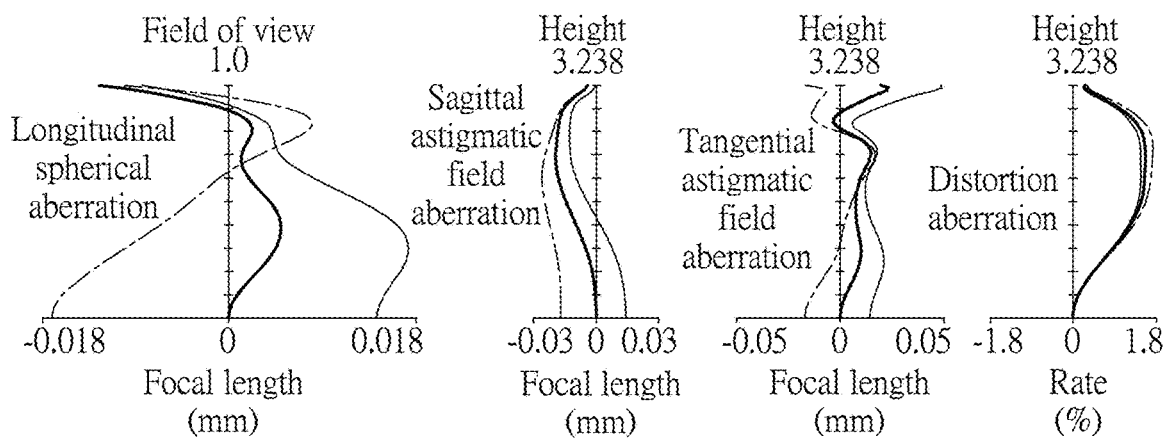
FIG. 9A illustrates the longitudinal spherical aberration on the image plane of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens set 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the part in a vicinity of the optical axis and the part in a vicinity of its circular periphery will be omitted in the following examples. Please refer to FIG. 9A for the longitudinal spherical aberration on the image plane 91 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the third lens element 30 has positive refractive power, the image-side surface 42 of the fourth lens element 40 has a convex part 47' in a vicinity of its circular periphery.

The optical data of the second example of the optical imaging lens set are shown in FIG. 22 while the aspheric surface data are shown in FIG. 23. TTL is 5.3991 mm. Fno is 1.6025. The image height is 3.238 mm. HFOV is 38.0020 degrees. In particular, 1) the TTL of the second example is shorter than that of the first example of the present invention, 2) the Fno of the second example is smaller than that of the first example of the present invention, 3) the imaging quality of the second example is better than that of the first example of the present invention, 4) the fabrication of the second example is easier than the first example so the yield is better.

THIRD EXAMPLE

Please refer to FIG. 10 which illustrates the third example of the optical imaging lens set 1 of the present invention. Please refer to FIG. 11A for the longitudinal spherical aberration on the image plane 91 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the image-side surface 12 of the first lens element 10 has a concave part 17' in a vicinity of its circular periphery and the image-side surface 42 of the fourth lens element 40 has a convex part 47' in a vicinity of its circular periphery.

The optical data of the third example of the optical imaging lens set are shown in FIG. 24 while the aspheric surface data are shown in FIG. 25. TTL is 5.3665 mm. Fno is 1.6197. The image height is 2.42 mm. HFOV is 30.1264 degrees. In particular, 1) the TTL of the third example is shorter than that of the first example of the present invention, 2) the Fno of the third example is smaller than that of the first example of the present invention, 3) the imaging quality of the third example is better than that of the first example of the present invention, 4) the fabrication of the third example is easier than the first example so the yield is better.

FOURTH EXAMPLE

Figure 12:
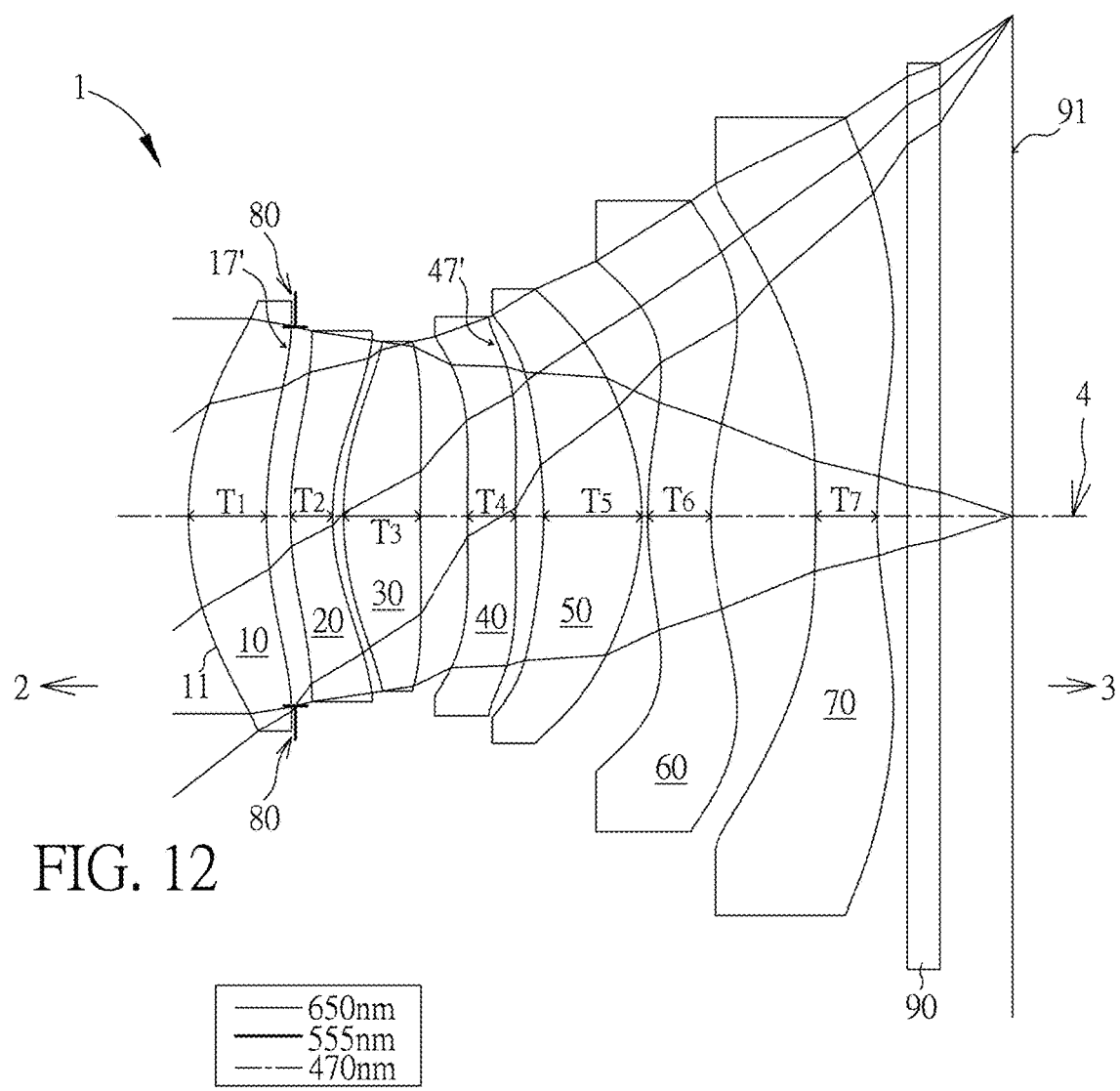
FIG. 12 illustrates a fourth example of the optical imaging lens set of seven lens elements of the present invention.
Figures 13A, 13B, 13C, 13D:
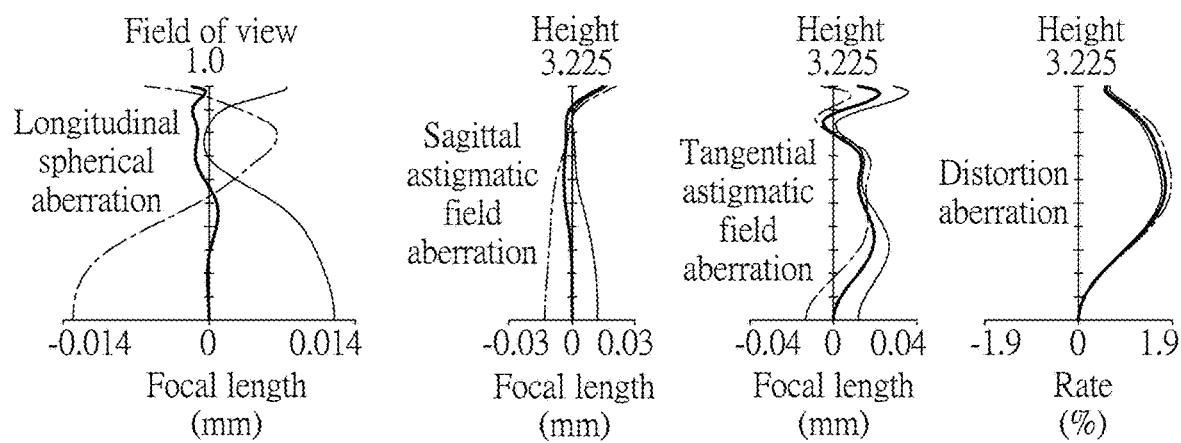
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 91 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the image-side surface 12 of the first lens element 10 has a concave part 17' in a vicinity of its circular periphery and the image-side surface 42 of the fourth lens element 40 has a convex part 47' in a vicinity of its circular periphery.

The optical data of the fourth example of the optical imaging lens set are shown in FIG. 26 while the aspheric surface data are shown in FIG. 27. TTL is 5.3157 mm. Fno is 1.6115. The image height is 3.225 mm. HFOV is 37.9995 degrees. In particular, 1) the TTL of the fourth example is shorter than that of the first example of the present invention, 2) the Fno of the fourth example is smaller than that of the first example of the present invention, 3) the imaging quality of the fourth example is better than that of the first example of the present invention, 4) the fabrication of the fourth example is easier than the first example so the yield is better.

FIFTH EXAMPLE

Figure 14:
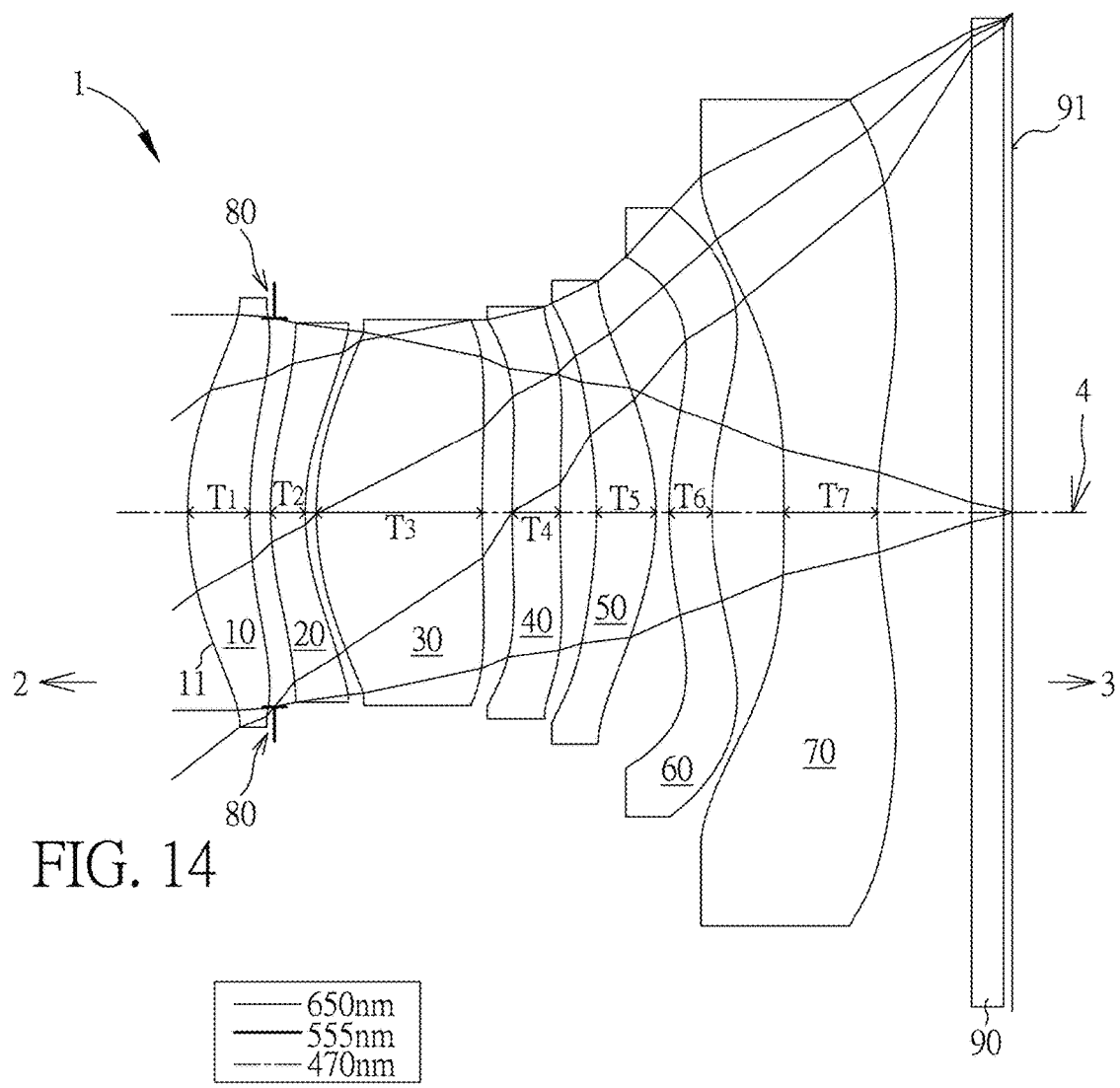
FIG. 14 illustrates a fifth example of the optical imaging lens set of seven lens elements of the present invention.
Figures 15A, 15B, 15C, 15D:
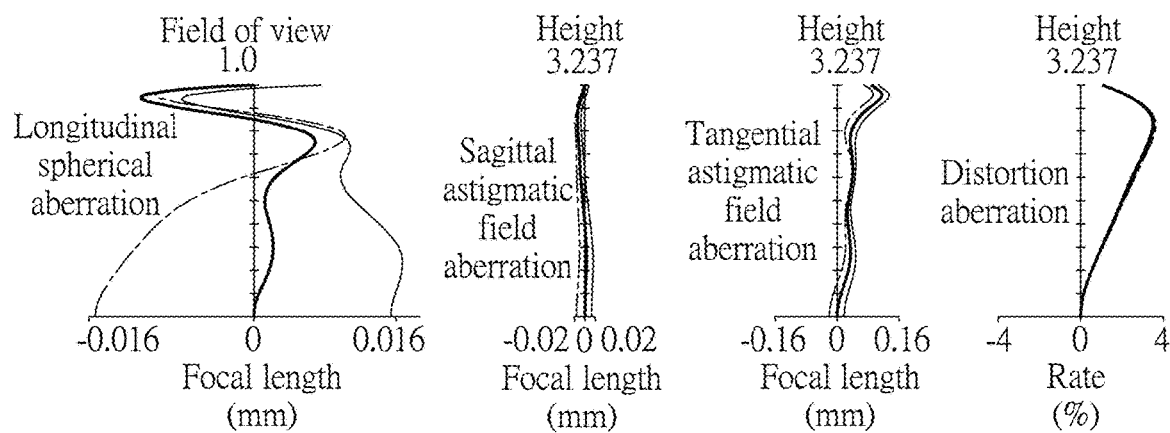
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 91 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example.

The optical data of the fifth example of the optical imaging lens set are shown in FIG. 28 while the aspheric surface data are shown in FIG. 29. TTL is 5.3343 mm. Fno is 1.6059. The image height is 3.237 mm. HFOV is 37.9981 degrees. In particular, 1) the TTL of the fifth example is shorter than that of the first example of the present invention, 2) the Fno of the fifth example is smaller than that of the first example of the present invention, 3) the imaging quality of the fifth example is better than that of the first example of the present invention, 4) the fabrication of the fifth example is easier than the first example so the yield is better.

SIXTH EXAMPLE

Figure 16:
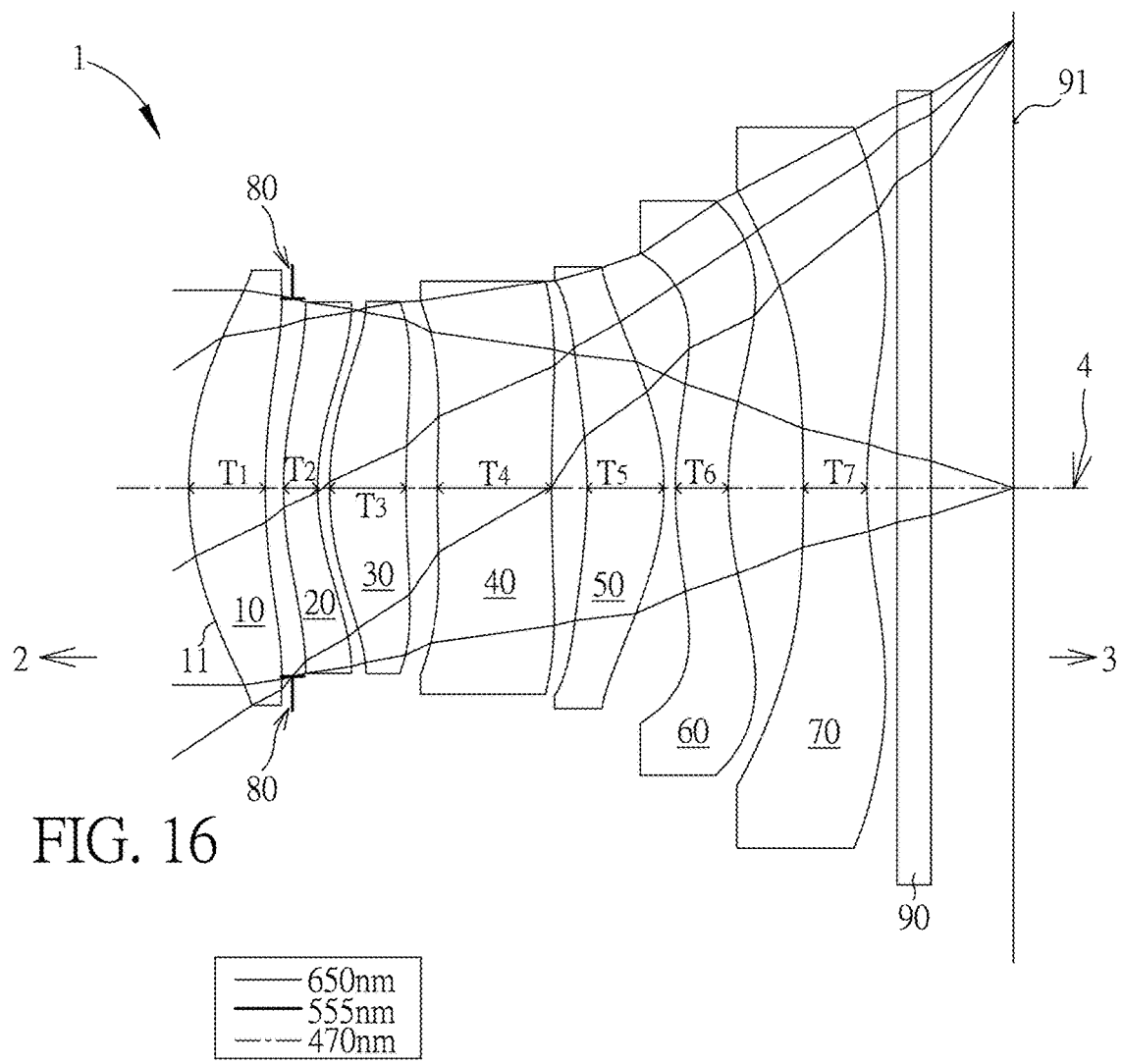
FIG. 16 illustrates a sixth example of the optical imaging lens set of seven lens elements of the present invention.
Figures 17A, 17B, 17C, 17D:
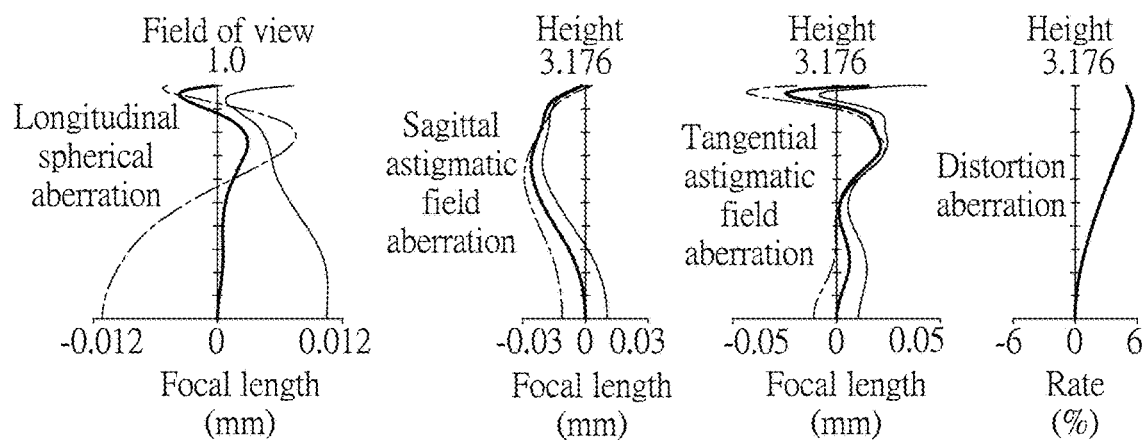
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens set 1 of the present invention. Please refer to FIG. 17A for the longitudinal spherical aberration on the image plane 91 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example.

The optical data of the sixth example of the optical imaging lens set are shown in FIG. 30 while the aspheric surface data are shown in FIG. 31. TTL is 5.0626 mm. Fno is 1.6014. The image height is 3.176 mm. HFOV is 37.9978 degrees. In particular, 1) the TTL of the sixth example is shorter than that of the first example of the present invention, 2) the imaging quality of the sixth example is better than that of the first example of the present invention, 3) the fabrication of the sixth example is easier than the first example so the yield is better.

SEVENTH EXAMPLE

Figure 18:
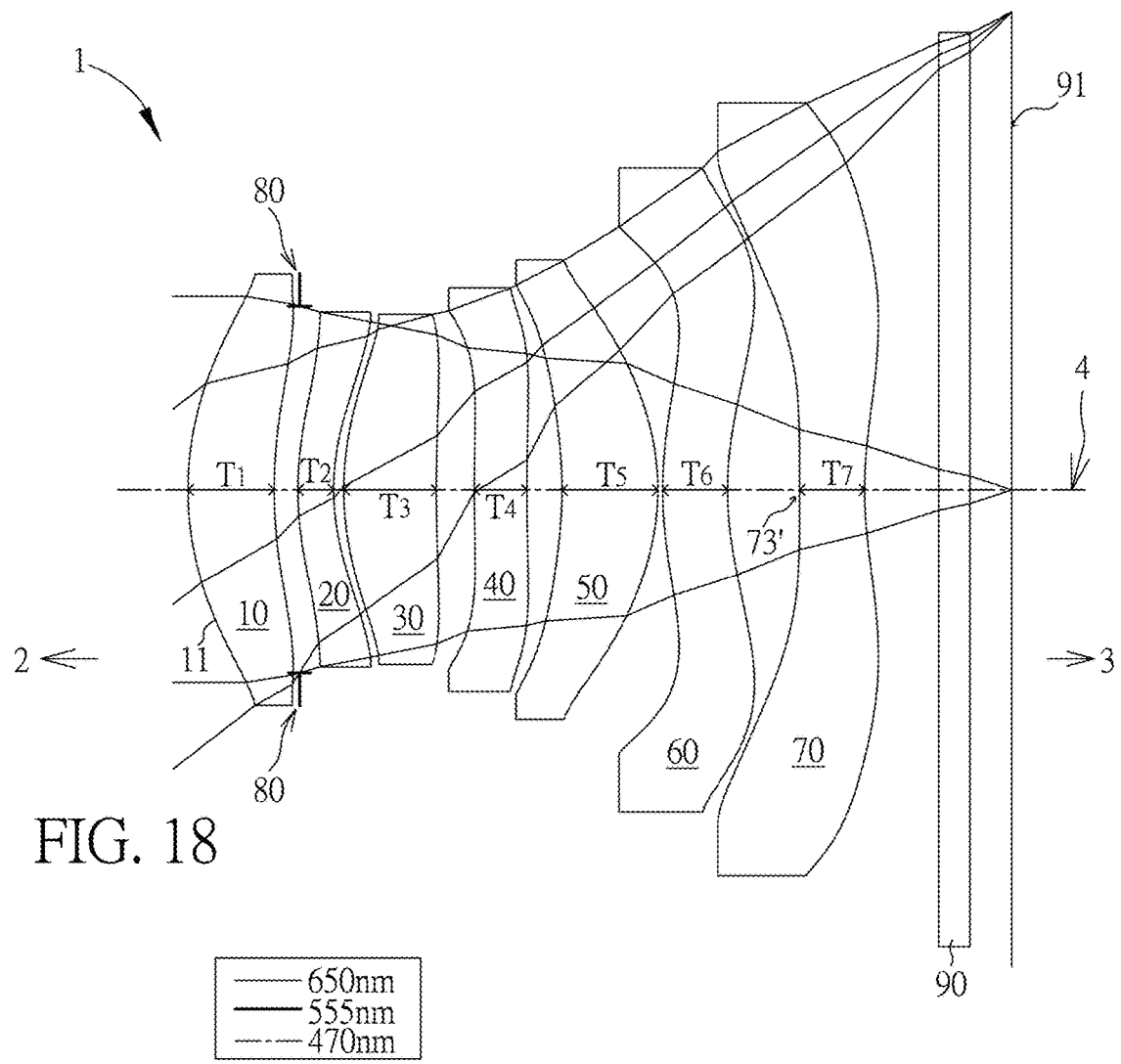
FIG. 18 illustrates a seventh example of the optical imaging lens set of seven lens elements of the present invention.
Figures 19A, 19B, 19C, 19D:
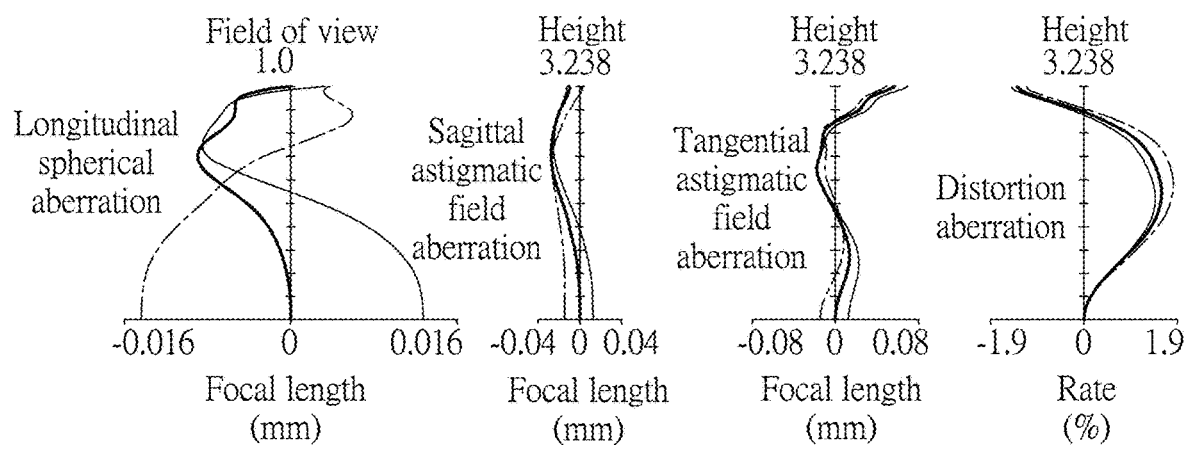
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens set 1 of the present invention. Please refer to FIG. 19A for the longitudinal spherical aberration on the image plane 91 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the object-side surface 71 of the seventh lens element 70 facing toward the object side 2 has a convex part 73' in the vicinity of the optical axis.

The optical data of the seventh example of the optical imaging lens set are shown in FIG. 32 while the aspheric surface data are shown in FIG. 33. TTL is 5.5733 mm. Fno is 1.6110. The image height is 3.238 mm. HFOV is 37.9627 degrees. In particular, 1) the Fno of the seventh example is smaller than that of the first example of the present invention, 2) the imaging quality of the seventh example is better than that of the first example of the present invention, 3) the fabrication of the seventh example is easier than the first example so the yield is better.

Some important ratios in each example are shown in FIG. 42 and in FIG. 42. The distance between the image-side surface 72 of the seventh lens element 70 to the filter 90 along the optical axis 4 is G7F; the thickness of the filter 90 along the optical axis 4 is TF; the distance between the filter 90 to the image plane 91 along the optical axis 4 is GFP; the distance between the image-side surface 72 of the seventh lens element 70 and the image plane 91 along the optical axis 4 is BFL. Therefore, BFL=G6F+TF+GFP.

In the light of the above examples, the inventors observe at least the following features of the lens arrangement of the present invention and the corresponding efficacy:

1. The first lens element of an image-side surface with a concave portion in a vicinity of the optical-axis helps the collection of incoming light. The sixth lens element has negative refractive power and an image-side surface with a concave portion in a vicinity of the optical-axis. They facilitate the adjustment of the aberration caused by the previous five lens elements. The fifth lens element has an object-side surface with a concave portion in a vicinity of the optical-axis or the seventh lens element of negative refractive power together to enhance the imaging quality.
2. The conditional formula $5 \leq 5\upsilon 1-(\upsilon 3+\upsilon 4+\upsilon 5+\upsilon 6+\upsilon 7)$, preferably $5 \leq 5\upsilon 1-(\upsilon 3+\upsilon 4+\upsilon 5+\upsilon 6+\upsilon 7) \leq 220$, lowers the bad imaging quality caused by the spherical aberration and the chromatic aberration.
3. The combination of the above designs may effectively shorten the lens length and ensure good imaging quality to enhance the image definition.

In addition, the inventors further discover that there are some better ratio ranges for different optical data according to the above various important ratios. Better optical ratio ranges help the designers to design a better optical performance and an effectively reduce length of a practically possible optical imaging lens set.

a) To diminish the total length, the present invention proposes to reduce the lens thickness and air gaps between adjacent lens elements. Taking the assembly fabrication and imaging quality into consideration, the lens thickness and the air gaps should be coordinated with each other. The following conditions help the optical imaging lens set have better arrangement:

ALT/Gmax≤7, preferably 3.0≤ALT/Gmax≤7;

Tmax/G67≤2.3, preferably 0.9≤Tmax/G67≤2.3;

(T5+T6+T7)/(T1+T2+T3)≤1.3, preferably 0.7≤(T5+T6+T7)/(T1+T2+T3)≤1.3;

ALT/AAG≤2.8, preferably 1.2≤ALT/AAG≤2.8;

Gmax/Tmin≤2.5, preferably 1.5≤Gmax/Tmin≤2.5;

Tmax/T7≤1.8, preferably 1.0≤Tmax/T7≤1.8;

T6/G34≤10, preferably 0.9≤T6/G34≤10;

(G12+G23+G56)/G45≤2, preferably 0.8≤(G12+G23+G56)/G45≤2.

b) A smaller EFL helps enlarge the field angle so the EFL is preferably smaller. The following conditions help the enlargement of the field angle in order to reduce the total length of the optical imaging lens set:

EFL/BFL≤4.7, preferably 4.2≤EFL/BFL≤4.7;

EFL/G67≤13, preferably 6.0 ≤EFL/G67≤13.

c) The optical parameters and the total length of the optical imaging lens set together keep a suitable range so the parameters are not so great to enlarge the total length of the optical imaging lens set or too small to fabricate.

TTL/AAG≤4.5, preferably 2.7≤TTL/AAG≤4.5;

TL/Tmin≤20, preferably 16.3≤TL/Tmin≤20;

TTL/Gmax≤11.9, preferably 6.6≤TTL/Gmax≤11.9;

TL/T4≤14.4, preferably 5.5≤TL/T4≤14.4;

TL/BFL≤5.1, preferably 4.2≤TL/BFL≤5.1.

d) By limiting the optical parameters and the second lens element thickness T2, the second lens element thickness T2 is not so large or so small to facilitate the reduction of the optical aberration cause by the first lens element.

(T1+T5)/T2≤5.5, preferably 3.1≤(T1+T5)/T2≤5.5.

In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths are pretty close to one another, which means the present invention is able to concentrate light of the three representing different wavelengths so that the aberration is greatly improved. Given the above, the present invention provides outstanding imaging quality.

In the light of the unpredictability of the optical imaging lens set, the present invention suggests the above principles to have a shorter total length of the optical imaging lens set, a larger aperture available, a wider field angle, better imaging quality or a better fabrication yield to overcome the drawbacks of prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element, a sixth lens element and a seventh lens element, said first lens element to said seventh lens element each having an object-side surface facing toward the object side to allow imaging rays to pass through as well as an image-side surface facing toward the image side to allow imaging rays to pass through, wherein:

said first lens element has an image-side surface with a concave portion in a vicinity of said optical-axis;

said second lens element has an object-side surface with a convex portion in a vicinity of said optical-axis;

said fourth lens element has an object-side surface with a convex portion in a vicinity of said optical-axis and an image-side surface with a concave portion in a vicinity of said optical-axis;

said sixth lens element has an image-side surface with a concave portion in a vicinity of said optical-axis;

said seventh lens element has negative refractive power; and the optical imaging lens set exclusively has seven lens elements with refractive power.

2. The optical imaging lens set of claim 1, wherein TL is a distance between said object-side surface of said first lens element and said image-side surface of said seventh lens element along said optical axis and said fourth lens element has a fourth lens element thickness T4 along said optical axis to satisfy TL/T4≤14.4.

3. The optical imaging lens set of claim 1, wherein ALT is a total thickness of all seven lens elements and Gmax is the maximal air gap among said first lens element and said seventh lens element to satisfy ALT/Gmax≤7.

4. The optical imaging lens set of claim 1, wherein EFL is an effective focal length of the optical imaging lens set and an air gap G67 between said sixth lens element, BFL is a distance between said image-side surface of said seventh lens element and an image plane along said optical axis and Tmax is the maximal lens element thickness among said first lens element to satisfy 4.629≤(EFL+BFL)/Tmax≤8.034.

5. The optical imaging lens set of claim 1, wherein Tmax is the maximal lens element thickness among said first lens element and said seventh lens element and an air gap G67 between said sixth lens element and said seventh lens element along said optical axis to satisfy Tmax/G67≤2.3.

6. The optical imaging lens set of claim 1, wherein Gmax is the maximal air gap among said first lens element and said seventh lens element, Tmax is the maximal lens element thickness among said first lens element and said seventh lens element and Tmin is the minimal lens element thickness among said first lens element and said seventh lens element to satisfy $1.335 \le (Tmax+Tmin)/Gmax \le 2.776$.

7. The optical imaging lens set of claim 1, wherein Gmax is the maximal air gap among said first lens element and said seventh lens element and Tmin is the minimal lens element thickness among said first lens element and said seventh lens element to satisfy $Gmax/Tmin \le 2.5$.

8. An optical imaging lens set, from an object side toward an image side in order along an optical axis comprising: a first lens element, a second lens element, a third lens element, a fourth lens element, a fifth lens element, a sixth lens element and a seventh lens element, said first lens element to said seventh lens element each having an object-side surface facing toward the object side to allow imaging rays to pass through as well as an image-side surface facing toward the image side to allow imaging rays to pass through, wherein:
said first lens element has an image-side surface with a concave portion in a vicinity of said optical-axis;
said second lens element has an object-side surface with a convex portion in a vicinity of said optical-axis;
said fourth lens element has an image-side surface with a concave portion in a vicinity of said optical-axis;
said sixth lens element has an object-side surface with a convex portion in a vicinity of said optical-axis; and
the optical imaging lens set exclusively has seven lens elements with refractive power, TL is a distance between said object-side surface of said first lens element and said image-side surface of said seventh lens element along said optical axis, Tmin is the minimal lens element thickness among said first lens element, an air gap G12 between said first lens element and said second lens element along said optical axis, an air gap G23 between said second lens element and said third lens element along said optical axis, an air gap G45 between said fourth lens element and said fifth lens element along said optical axis and an air gap G56 between said fifth lens element and said sixth lens element along said optical axis to satisfy $TL/Tmin \le 20$ and $(G12+G23+G56)/G45 \le 2$.

9. The optical imaging lens set of claim 8, wherein BFL is a distance between said image-side surface of said seventh lens element and an image plane along said optical axis to satisfy $TL/BFL \le 5.1$.

10. The optical imaging lens set of claim 8, wherein EFL is an effective focal length of the optical imaging lens set and Gmax is the maximal air gap among said first lens element and said seventh lens element to satisfy $6.065 \le EFL/Gmax \le 8.880$.

11. The optical imaging lens set of claim 8, wherein EFL is an effective focal length of the optical imaging lens set and an air gap G67 between said sixth lens element and said seventh lens element along said optical axis to satisfy $EFL/G67 \le 13$.

12. The optical imaging lens set of claim 8, wherein Tmax is the maximal lens element thickness among said first lens element and said seventh lens element and said seventh lens element has a seventh lens element thickness T7 along said optical axis to satisfy $Tmax/T7 \le 1.8$.

13. The optical imaging lens set of claim 8, wherein Gmax is the maximal air gap among said first lens element and said seventh lens element, Tmax is the maximal lens element thickness among said first lens element and said seventh lens element and said first lens element has a first lens element thickness T1 along said optical axis to satisfy $1.946 \le (Gmax+Tmax)/T1 \le 3.855$.

14. The optical imaging lens set of claim 8, wherein Gmax is the maximal air gap among said first lens element and said seventh lens element and said fourth lens element has a fourth lens element thickness T4 along said optical axis to satisfy $0.954 \le (Gmax+Tmin)/T4 \le 3.057$.

15. An optical imaging lens set, from an object side toward an image side in order along an optical axis comprising: a first lens element, a second lens element, a third lens element, a fourth lens element, a fifth lens element, a sixth lens element and a seventh lens element, said first lens element to said seventh lens element each having an object-side surface facing toward the object side to allow imaging rays to pass through as well as an image-side surface facing toward the image side to allow imaging rays to pass through, wherein:
said first lens element has an image-side surface with a concave portion in a vicinity of said optical-axis;
said second lens element has an object-side surface with a convex portion in a vicinity of its circular periphery;
said fourth lens element has an image-side surface with a concave portion in a vicinity of said optical-axis;
said sixth lens element has an object-side surface with a convex portion in a vicinity of said optical-axis; and
the optical imaging lens set exclusively has seven lens elements with refractive power, TL is a distance between said object-side surface of said first lens element and said image-side surface of said seventh lens element along said optical axis, Tmin is the minimal lens element thickness among said first lens element, an air gap G12 between said first lens element and said second lens element along said optical axis, an air gap G23 between said second lens element and said third lens element along said optical axis, an air gap G45 between said fourth lens element and said fifth lens element along said optical axis and an air gap G56 between said fifth lens element and said sixth lens element along said optical axis to satisfy $TL/Tmin \le 20$ and $(G12+G23+G56)/G45 \le 2$.

16. The optical imaging lens set of claim 15, wherein Gmax is the maximal air gap among said first lens element and said seventh lens element to satisfy $6.555 \le TL/Gmax \le 9.615$.

17. The optical imaging lens set of claim 15, wherein said second lens element has a second lens element thickness T2 along said optical axis, said third lens element has a third lens element thickness T3 along said optical axis, said fourth lens element has a fourth lens element thickness T4 along said optical axis, said fifth lens element has a fifth lens element thickness T5 along said optical axis, said sixth lens element has a sixth lens element thickness T6 along said optical axis and an air gap G34 between said third lens element and said fourth lens element along said optical axis to satisfy $1.286 \le (T2+T3+G34+T4)/(T5+T6) \le 2.719$.

18. The optical imaging lens set of claim 15, wherein EFL is an effective focal length of the optical imaging lens set and Tmax is the maximal lens element thickness among said first lens element and said seventh lens element to satisfy $3.816 \le EFL/Tmax \le 6.500$.

19. The optical imaging lens set of claim 15, wherein ALT is a total thickness of all seven lens elements and AAG is a sum of all six air gaps between each lens elements from said first lens element to said seventh lens element along said optical axis to satisfy $ALT/AAG \le 2.8$.

20. The optical imaging lens set of claim 15, wherein $\upsilon 5$ is an Abbe number of said fifth lens element, $\upsilon 6$ is an Abbe number of said sixth lens element and υ7 is an Abbe number of said seventh lens element to satisfy $134.411 \leq \upsilon 5+\upsilon 6+\upsilon 7 \leq 167.961$.

\* \* \* \* \*